United States Patent
Jang

(10) Patent No.: US 11,024,840 B2
(45) Date of Patent: Jun. 1, 2021

(54) ALKALI METAL-SULFUR SECONDARY BATTERY CONTAINING A NON-ELECTRONICALLY CONDUCTIVE ANODE-PROTECTING LAYER

(71) Applicant: Nanotek Instruments, Inc., Dayton, OH (US)

(72) Inventor: Bor Z. Jang, Centerville, OH (US)

(73) Assignee: Global Graphene Group, Inc., Dayton, OH (US)

(*) Notice: Subject to any disclaimer, the term of this patent is extended or adjusted under 35 U.S.C. 154(b) by 30 days.

(21) Appl. No.: 16/241,166

(22) Filed: Jan. 7, 2019

(65) Prior Publication Data
US 2020/0220162 A1   Jul. 9, 2020

(51) Int. Cl.
| H01M 10/44 | (2006.01) |
| H01M 4/36 | (2006.01) |
| H01M 4/58 | (2010.01) |
| H01M 10/0525 | (2010.01) |
| H01M 4/24 | (2006.01) |
| H01M 4/38 | (2006.01) |

(52) U.S. Cl.
CPC .......... H01M 4/366 (2013.01); H01M 4/24 (2013.01); H01M 4/364 (2013.01); H01M 4/382 (2013.01); H01M 4/5815 (2013.01); H01M 10/0525 (2013.01)

(58) Field of Classification Search
CPC ........ H01M 4/366; H01M 4/24; H01M 4/364; H01M 4/362; H01M 4/382; H01M 4/381; H01M 4/5815; H01M 4/581; H01M 10/0525; H01M 10/052
See application file for complete search history.

(56) References Cited

U.S. PATENT DOCUMENTS

| 2015/0030934 A1* | 1/2015 | Kolosnitsyn .......... H01M 4/134 429/231.95 |
| 2015/0221937 A1* | 8/2015 | Kim .................... H01M 4/1397 429/231.4 |
| 2017/0207488 A1* | 7/2017 | Zhamu ............... H01M 4/1395 |

* cited by examiner

*Primary Examiner* — Raymond Alejandro

(57) ABSTRACT

Provided is a rechargeable alkali metal-sulfur cell comprising an anode active material layer, a cathode active material layer, a discrete anode-protecting layer disposed between the anode active material layer and the cathode active material layer, and an electrolyte (but no porous separator), wherein the anode-protecting layer has a thickness from 1 nm to 100 μm and comprises an elastomer having a fully recoverable tensile elastic strain from 2% to 1,000% and a lithium ion conductivity from $10^{-8}$ S/cm to $5 \times 10^{-2}$ S/cm when measure at room temperature. The cathode layer comprises a sulfur-containing material selected from a sulfur-carbon hybrid, sulfur-graphite hybrid, sulfur-graphene hybrid, conducting polymer-sulfur hybrid, metal sulfide, sulfur compound, or a combination thereof. This battery exhibits an excellent combination of high sulfur content, high sulfur utilization efficiency, high energy density, no known dendrite issue, no dead lithium or dead sodium issue, and a long cycle life.

22 Claims, 7 Drawing Sheets

ALKALI METAL-SULFUR SECONDARY BATTERY CONTAINING A NON-ELECTRONICALLY CONDUCTIVE ANODE-PROTECTING LAYER

FIELD OF THE INVENTION

The present invention provides a protective layer for use in a secondary or rechargeable alkali metal-sulfur battery, including the lithium-sulfur battery, sodium-sulfur battery, and potassium-sulfur battery.

BACKGROUND

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8 + 16 Li \leftrightarrow 8 Li_2 S$ that lies near 2.2 V with respect to $Li^+/Li^o$. This electrochemical potential is approximately ⅔ of that exhibited by conventional positive electrodes (e.g. $LiMnO_4$). However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/l, respectively, based on the combined Li and S weight or volume. If based on the total cell weight or volume, the energy densities of optimally designed Li—S cell configurations can reach approximately 1,000 Wh/kg and 1,100 Wh/l, respectively. However, the current Li-sulfur cells reported by industry leaders in sulfur cathode technology have a maximum cell specific energy of 250-400 Wh/kg (based on the total cell weight), which is far below what is possible.

In summary, despite its considerable advantages, the Li—S cell is plagued with several major technical problems that have thus far hindered its widespread commercialization:

(1) Conventional lithium metal cells still have dendrite formation and related internal shorting issues.
(2) Sulfur or sulfur-containing organic compounds are highly insulating, both electrically and ionically. To enable a reversible electrochemical reaction at high current densities or charge/discharge rates, the sulfur must maintain intimate contact with an electrically conductive additive. Various carbon-sulfur composites have been utilized for this purpose, but only with limited success owing to the limited scale of the contact area. Typical reported capacities are between 300 and 550 mAh/g (based on the cathode carbon-sulfur composite weight) at moderate rates.
(3) The cell tends to exhibit significant capacity decay during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator to the Li negative electrode whereupon they are reduced to solid precipitates ($Li_2S_2$ and/or $Li_2S$), causing active mass loss. In addition, the solid product that precipitates on the surface of the positive electrode during discharge becomes electrochemically irreversible, which also contributes to active mass loss.
(4) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications. Despite the various approaches proposed for the fabrication of high energy density Li—S cells, there remains a need for cathode materials, production processes, and cell operation methods that retard the out-diffusion of S or lithium polysulfide from the cathode compartments into other components in these cells, improve the utilization of electroactive cathode materials (S utilization efficiency), and provide rechargeable Li—S cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-sulfur secondary battery if dendrite related issues could be addressed.

Sodium metal (Na) and potassium metal (K) have similar chemical characteristics to Li and the sulfur cathode in room temperature sodium-sulfur cells (RT Na—S batteries) or potassium-sulfur cells (K—S) face the same issues observed in Li—S batteries, such as: (i) low active material utilization rate, (ii) poor cycle life, and (iii) low Coulombic efficiency. Again, these drawbacks arise mainly from insulating nature of S, dissolution of S and Na or K polysulfide intermediates in liquid electrolytes (and related Shuttle effect), and large volume change during charge/discharge.

Hence, an object of the present invention is to provide a rechargeable alkali metal battery (e.g., Li—S, Na—S, and K—S battery) that exhibits an exceptionally high specific energy or high energy density. One particular technical goal of the present invention is to provide an alkali metal-sulfur or alkali ion-sulfur cell with a cell specific energy greater than 400 Wh/Kg, preferably greater than 500 Wh/Kg, and more preferably greater than 600 Wh/kg (all based on the total cell weight).

Another object of the present invention is to provide an alkali metal-sulfur cell that exhibits a high cathode specific capacity (higher than 1,200 mAh/g based on the sulfur weight, or higher than 1,000 mAh/g based on the cathode composite weight, including sulfur, conducting additive or substrate, and binder weights combined, but excluding the weight of cathode current collector). The specific capacity is preferably higher than 1,400 mAh/g based on the sulfur weight alone or higher than 1,200 mAh/g based on the cathode composite weight. This must be accompanied by a high specific energy, good resistance to dendrite formation, and a long and stable cycle life.

It may be noted that in most of the open literature reports (scientific papers) and patent documents, scientists or inventors choose to express the cathode specific capacity based on the sulfur or lithium polysulfide weight alone (not the total cathode composite weight), but unfortunately a large proportion of non-active materials (those not capable of storing lithium, such as conductive additive and binder) is typically used in their Li—S cells. For practical use purposes, it is more meaningful to use the cathode composite weight-based capacity value.

A specific object of the present invention is to provide a rechargeable alkali metal-sulfur cell based on rational materials and battery designs that overcome or significantly reduce the following issues commonly associated with conventional Li—S and room temperature Na—S cells: (a) dendrite formation (internal shorting); (b) extremely low electric and ionic conductivities of sulfur, requiring large proportion (typically 30-55%) of non-active conductive fillers and having significant proportion of non-accessible or non-reachable sulfur or alkali metal polysulfides); (c) poor sulfur utilization efficiency; (d) dissolution of S and alkali metal polysulfide in electrolyte; (e) migration of alkali metal polysulfides from the cathode to the anode (which irreversibly react with Li, Na, or K at the anode), resulting in active material loss and capacity decay (the shuttle effect); and (f) short cycle life.

SUMMARY OF THE INVENTION

The present invention provides an alkali metal-sulfur cell (e.g. lithium-sulfur cell, sodium-sulfur cell, and potassium-sulfur cell). The lithium-sulfur battery can include the lithium metal-sulfur battery (having lithium metal as the anode active material and sulfur as the cathode active material) and the lithium ion-sulfur battery (e.g. prelithiated Si or graphite as the anode active material and sulfur as the cathode active material). The sodium-sulfur battery can include the sodium metal-sulfur battery (having sodium metal as the anode active material and sulfur as the cathode active material) and the sodium ion-sulfur battery (e.g. hard carbon as the anode active material and sulfur as the cathode active material).

The invention also provides a method of improving a cycle-life of a rechargeable alkali metal-sulfur cell, the method comprising implementing an electronically non-conducting anode-protecting layer between an anode active material layer and a cathode active material without using a porous separator in the cell, wherein the anode-protecting layer has a thickness from 1 nm to 100 μm and comprises an elastomer having a fully recoverable tensile elastic strain from 2% to 1,000%, a lithium ion or sodium ion conductivity from $10^{-8}$ S/cm to $5 \times 10^{-2}$ S/cm, and an electronic conductivity less than $10^{-4}$ S/cm when measured at room temperature. This battery exhibits an excellent combination of high sulfur content, high sulfur utilization efficiency, high energy density, no known dendrite issue, no dead lithium or dead sodium issue, and a long cycle life.

In some embodiments, the alkali metal-sulfur cell (selected from lithium-sulfur cell, sodium-sulfur cell, or potassium-sulfur cell, said alkali metal-sulfur cell) comprises: (a) an anode active material layer and an optional anode current collector supporting the anode active material layer; (b) a cathode active material layer, comprising a sulfur-containing material selected from a sulfur-carbon hybrid, sulfur-graphite hybrid, sulfur-graphene hybrid, conducting polymer-sulfur hybrid, metal sulfide, sulfur compound, or a combination thereof, and an optional cathode current collector supporting said cathode active material layer; (c) an electrolyte, in ionic contact with the anode active material layer and the cathode active material layer, but no porous separator layer; and (d) a discrete anode-protecting layer (electronically non-conducting but ionically conducting) disposed between the anode active material layer and the cathode active material layer; wherein the anode-protecting layer has a thickness from 1 nm to 100 μm and comprises an elastomer having a fully recoverable tensile elastic strain from 2% to 1,000%, a lithium ion conductivity from $10^{-8}$ S/cm to $5 \times 10^{-2}$ S/cm, and an electronic conductivity less than $10^{-8}$ S/cm (typically from $10^{-22}$ S/cm to $10^{-4}$ S/cm) when measured at room temperature.

This range of electronic conductivity less than $10^{-8}$ S/cm implies that this elastomer-based anode protecting layer is not electronically conducting. This feature is essential to the role played by the anode-protecting layer as a separator (replacing the conventional porous separator, such as ethylene-propylene polymer) to electronically isolate the anode from the cathode to prevent internal shorting. However, this layer must be conducting to lithium ions, sodium ions, etc.

In certain embodiments, the elastomer comprises from 0.01% to 50% of an electrically non-conducting reinforcement material dispersed therein, wherein the reinforcement material is selected from a glass fiber, ceramic fiber, polymer fiber, glass particle, ceramic particle, polymer particle, or a combination thereof. This reinforcement increases the resistance of the elastomer layer to the penetration by any lithium or sodium dendrite, if ever existing.

Preferably, the anode active material layer, the elastomer-based anode-protecting layer, and the cathode layer are laminated together in such a manner (e.g. roll-pressed together) that the resulting cell is under a compressive stress or strain for the purpose of maintaining a good contact between the anode active material layer and the anode-protecting layer and/or a good contact between the cathode active material layer and the anode-protecting layer (which also serves as a separator that electronically isolates the anode from the cathode).

In the alkali metal-sulfur secondary battery, the electrolyte is preferably a non-solid state electrolyte preferably selected from organic liquid electrolyte, ionic liquid electrolyte, polymer gel electrolyte, quasi-solid electrolyte having a lithium salt dissolved in an organic or ionic liquid with a lithium salt concentration higher than 2.0 M (from 2.0M to 14 M; typically from 2.5 M to 10 M; and more typically from 3.5M to 7 M), or a combination thereof.

It is well-known in the art that a porous separator may not be necessary if the electrolyte is a solid-state electrolyte; but, a porous separator is normally required in order to electronically separate the anode from the cathode if the electrolyte contains a liquid ingredient, such as in an organic liquid electrolyte, ionic liquid electrolyte, polymer gel electrolyte (polymer+ liquid solvent), and quasi-solid electrolyte. The elastomer-based anode-protecting layer itself acts as a separator to electrically isolate the anode and the cathode. This protective layer, being as thin as a few nanometers and typically from 10 nm to 10 μm, is significantly thinner than the typically >20 μm in thickness of the conventional porous separator. Yet, this elastomer also plays the roles of protecting the lithium anode, preventing lithium dendrite formation and penetration, provides an environment conducive to uniform and uninterrupted transport and re-deposition of lithium ions, etc. The reduced weight and volume also leads to increased specific energy (Wh/kg) and volumetric energy density (Wh/L).

The foil or coating of lithium or lithium alloy may be supported by a current collector (e.g. a Cu foil, a Ni foam, a porous layer of nanofilaments, such as graphene sheets, carbon nanofibers, carbon nanotubes, etc.).

The elastomer, if sulfonated, becomes significantly more lithium ion-conducting. The lithium ion conductivity of an elastomer, sulfonated or un-sulfonated, may be further improved if some desired amount of lithium ion-conducting additive is incorporated into the elastomer matrix.

It may be noted that lithium foil/coating layer may decrease in thickness due to dissolution of lithium into the electrolyte to become lithium ions as the lithium-sulfur battery is discharged, creating a gap between the current collector and the protective layer if the protective layer were not elastic. Such a gap would make the re-deposition of lithium ions back to the anode impossible. We have observed that the instant elastomer layer is capable of expanding or shrinking congruently or conformably with the anode layer. This capability helps to maintain a good contact between the current collector (or the lithium film itself) and the protective layer, enabling the re-deposition of lithium ions without interruption. Similar advantages are observed for both the sodium-sulfur cell and the potassium-sulfur cell.

The sulfur-carbon hybrid, sulfur-graphite hybrid, sulfur-graphene hybrid, or conducting polymer-sulfur hybrid may be a mixture, blend, composite, or chemically or physically bonded entity of sulfur or sulfide with a carbon, graphite, graphene, or conducting polymer material. For instance, a sulfur-graphene hybrid can be a simple mixture (in a particle form) of sulfur and graphene prepared by ball-milling. Such a hybrid can contain sulfur bonded on surfaces of a graphene oxide sheet, etc. As another example, the sulfur-carbon hybrid can be a simple mixture (in a particle form) of sulfur and carbon nanotubes, or can contain sulfur residing in pores of activated carbon particles.

In the rechargeable alkali metal-sulfur cell, the metal sulfide may contain a material denoted by $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M preferably is selected from Li, Na, K, Mg, Zn, Cu, Ti, Ni, Co, Fe, or Al.

In some preferred embodiments, the metal sulfide in the cathode layer contains $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S_1$, $K_2S_2$, $K_2S_3$, $K_2S_4$, $K_2S_5$, $K_2S_6$, $K_2S_7$, $K_2S_8$, $K_2S_9$, or $K_2S_{10}$.

In the rechargeable alkali metal-sulfur cell, the carbon or graphite material in the cathode active material layer may be selected from mesophase pitch, mesophase carbon, meso-carbon microbead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, an activated version thereof, an activated carbon, carbon black, acetylene black, or a combination thereof. The graphene may be selected from pristine graphene, graphene oxide, reduced graphene oxide (RGO), graphene fluoride, nitrogenated graphene, hydrogenated graphene, doped graphene, functionalized graphene, or a combination thereof.

In certain embodiments, the elastomer further contains from 0.1% to 50% by weight of a lithium ion-conducting additive dispersed therein. In certain embodiments, the lithium ion-conducting may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

In certain embodiments, the lithium ion-conducting additive or sodium ion-conducting additive is selected from the following lithium salts or their sodium salt counterparts: lithium perchlorate ($LiClO_4$), lithium hexafluorophosphate ($LiPF_6$), lithium borofluoride ($LiBF_4$), lithium hexafluoro-arsenide ($LiAsF_6$), lithium trifluoro-methanesulfonate ($LiCF_3SO_3$), bis-trifluoromethyl sulfonylimide lithium (LiN$(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

In certain embodiments, the elastomer forms a mixture or blend with a lithium ion-conducting polymer selected from a lower molecular weight (<500,000 g/mole) version of poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof.

In some embodiments, the sulfonated elastomer has a lithium ion conductivity from $1\times10^{-5}$ S/cm to $5\times10^{-2}$ S/cm at room temperature.

The present invention enables the rechargeable alkali metal-sulfur cell to deliver a sulfur utilization efficiency from 80% to 99%, more typically from 85% to 97%.

In the rechargeable alkali metal-sulfur cell, the electrolyte is selected from polymer gel electrolyte, composite electrolyte, ionic liquid electrolyte, aqueous electrolyte, organic liquid electrolyte, soft matter phase electrolyte, quasi-solid-state electrolyte, or a combination thereof. The electrolyte may contain a salt selected from lithium perchlorate (LiClO$_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium (LiN$(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide potassium (KN(CF$_3$SO$_2$)$_2$), or a combination thereof.

The electrolyte may contain a solvent selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

In certain embodiments, the anode active material layer of the invented cell contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, Li$_4$Ti$_5$O$_{12}$, or a combination thereof.

The rechargeable alkali metal-sulfur cell may be a lithium ion-sulfur cell and, in this case, the anode active material layer contains an anode active material selected from the group consisting of: (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe) and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof.

The rechargeable alkali metal-sulfur cell may be a sodium ion-sulfur cell or potassium ion-sulfur cell and, in this case, the anode active material layer contains an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof; and combinations thereof.

The invention also provides a method of extending the cycle-life of an alkali metal-sulfur cell. The method comprises implementing an anode-protecting layer between an anode active material layer and a cathode active material and there is no porous separator, wherein the anode-protecting layer comprises an elastomer having a recoverable tensile elastic strain from 2% to 1,000% (preferably from 5% to 300%), a lithium ion conductivity no less than 10$^{-8}$ S/cm at room temperature, and a thickness from 1 nm to 100 μm (preferably from 10 nm to 10 μm).

In certain embodiments, the elastomer comprises from 0.01% to 50% of an electrically non-conducting reinforcement material dispersed therein, wherein the reinforcement material is selected from a glass fiber, ceramic fiber, polymer fiber, or a combination thereof. The electrically non-conductive reinforcement may also be selected from glass particles, ceramic particles, polymer particles, etc. The reinforcement material can increase the mechanical strength and the lithium dendrite penetration resistance of the elastomer layer.

In some embodiments, the cathode active material layer comprises a sulfur-containing material selected from a sulfur-carbon hybrid, sulfur-graphite hybrid, sulfur-graphene hybrid, conducting polymer-sulfur hybrid, metal sulfide, sulfur compound, or a combination thereof. The sulfur-carbon hybrid, sulfur-graphite hybrid, sulfur-graphene hybrid, or conducting polymer-sulfur hybrid may be a mixture, blend, composite, chemically or physically bonded entity of sulfur or sulfide with a carbon, graphite, graphene, or conducting polymer material.

The present invention also provides a method of manufacturing a rechargeable alkali metal-sulfur cell selected from a lithium-sulfur cell, sodium-sulfur cell, or potassium-sulfur cell. The method comprises: (a) providing a cathode active material layer and an optional cathode current collector to support the cathode active material layer; (b) providing an anode active material layer (containing a lithium metal or lithium alloy foil or coating) and an optional anode current collector to support the lithium metal or lithium alloy foil or coating; (c) providing an electrolyte in contact with the anode active material layer and the cathode active material layer, without using a separator, to electrically separate the anode and the cathode; (d) providing an anode-protecting layer of an elastomer having a recoverable tensile elastic strain from 2% to 1,000% (preferably from 5% to 300%), a lithium ion conductivity no less than 10$^{-8}$ S/cm at room temperature, and a thickness from 1 nm to 100 μm (preferably from 10 nm to 10 μm). This anode-protecting layer is disposed between the lithium metal or lithium alloy foil/coating and the cathode.

The invention also provides a method of improving the cycle-life of a lithium-sulfur cell. The method comprises implementing an anode-protecting layer between an anode active material layer and a cathode electrode without using a porous separator. The anode-protecting layer comprises an elastomer having a recoverable tensile elastic strain from 2% to 1,000% (preferably from 5% to 300%), a lithium ion conductivity no less than 10$^{-8}$ S/cm (preferably >10$^{-5}$ S/cm), and an electronic conductivity less than 10$^{-8}$ S/cm (typically down to 10$^{-22}$ S/cm) at room temperature, and a thickness from 1 nm to 100 μm (preferably from 10 nm to 10 μm).

In some embodiments, the elastomer contains a material selected from a sulfonated or non-sulfonated version of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) elastomer, poly(ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

In the above-defined method, the step of implementing an anode-protecting layer may be conducted by depositing a layer of an elastomer onto one primary surface of the anode active material layer to form a protected anode. This step comprises optionally compressing the protected anode to improve a contact between the anode-protecting layer and the anode active material layer, followed by combining the protected anode and the cathode together to form the alkali metal-sulfur cell. A good contact between the anode active material layer and the anode-protecting layer is essential to reducing internal resistance.

In certain embodiments, the step of implementing the anode-protecting layer is conducted by (i) preparing an anode active material layer (e.g. a layer of Li foil deposited on a Cu foil surface) and a cathode active material layer (e.g. a layer of graphene-supported sulfur); (ii) preparing a free-standing layer of an elastomer; and (iii) combining the anode active material layer, the elastomer layer, and the cathode active material layer, and a non-solid state electrolyte together to form the alkali metal-sulfur battery. A compressive stress may be advantageously applied (e.g. via press-rolling) to improve the contact between the anode-protecting layer and the anode active material layer to be protected.

Preferably, the elastomer layer has a lithium-ion conductivity from $10^{-5}$ S/cm to $5 \times 10^{-2}$ S/cm and an electron conductivity of $10^{-22}$ S/cm to $10^{-8}$ S/cm. In some embodiments, the elastomer has a recoverable tensile strain from 10% to 300% (more preferably >30%, and further more preferably >50%).

In certain embodiments, the procedure of providing an elastomer contains providing a mixture/blend/composite of an elastomer (sulfonated or un-sulfonated) with a lithium-ion conducting material, a reinforcement material (e.g. glass fibers, polymer fibers, etc.), or a combination thereof.

In this mixture/blend/composite, the lithium ion-conducting material is dispersed in the elastomer and is preferably selected from $Li_2CO_3$, $Li_2O$, $Li_2C_2O_4$, $LiOH$, $LiX$, $ROCO_2Li$, $HCOLi$, $ROLi$, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x \leq 1$, $1 \leq y \leq 4$.

In some embodiments, the lithium ion-conducting material is dispersed in the sulfonated elastomer composite and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), The anode-protecting layer implemented between the anode active layer and the cathode is mainly for the purpose of reducing or eliminating the lithium metal dendrite by providing a more stable Li metal-electrolyte interface that is more conducive to uniform deposition of Li metal during battery charges. The anode-protecting layer also acts to block the penetration of any dendrite, if initiated, from reaching the cathode. The anode-protecting layer, being highly elastic, also can shrink or expand conformally, responsive to the thickness increase or decrease of the anode active material layer. Other advantages will become more transparent later.

These and other advantages and features of the present invention will become more transparent with the description of the following best mode practice and illustrative examples.

DETAILED DESCRIPTION OF PREFERRED EMBODIMENTS

Figure 1A:
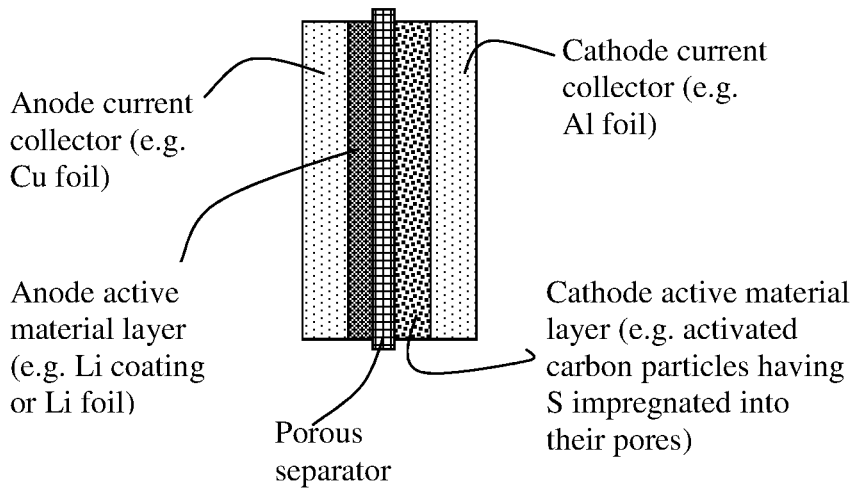
FIG. 1(A) Schematic of a prior art alkali metal-sulfur battery cell.
Figure 1B:
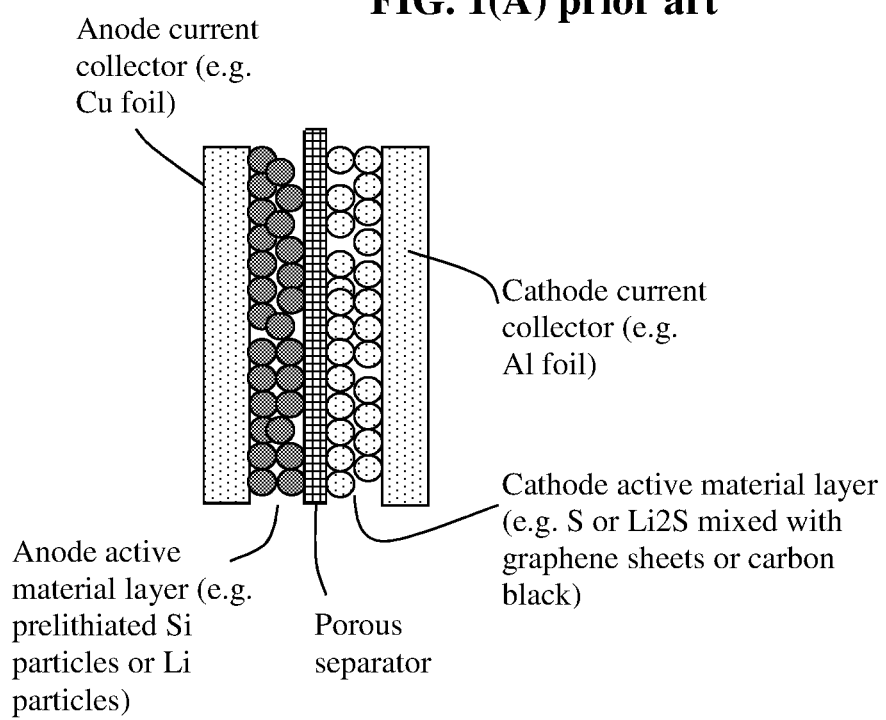
FIG. 1(B) Schematic of another prior art alkali metal-sulfur battery cell.

For convenience, the following discussion of preferred embodiments is primarily based on Li—S cells, but the same or similar composition, structure, and methods are applicable to Na—S and K—S cells. Examples are presented for Li—S cells, room-temperature Na—S cells, and K—S cells. Conventional Li—S cells are illustrated in FIG. 1(A) and FIG. 1(B).

A. Alkali Metal-Sulfur Cells (Using Lithium-Sulfur Cells as an Example)

The specific capacity and specific energy of a Li—S cell (or Na—S, or K—S cell) are dictated by the actual amount of sulfur that can be implemented in the cathode active layer (relative to other non-active ingredients, such as the binder resin and conductive filler) and the utilization rate of this sulfur amount (i.e. the utilization efficiency of the cathode active material or the actual proportion of S that actively participates in storing and releasing lithium ions). Using Li—S cell as an illustrative example, a high-capacity and high-energy Li—S cell requires a high amount of S in the cathode active layer (i.e. relative to the amounts of non-active materials, such as the binder resin, conductive additive, and other modifying or supporting materials) and a high S utilization efficiency). The present invention provides such a cathode active layer, its constituent powder mass product, the resulting Li—S cell, and a method of producing such a cathode active layer and battery.

Figure 2:
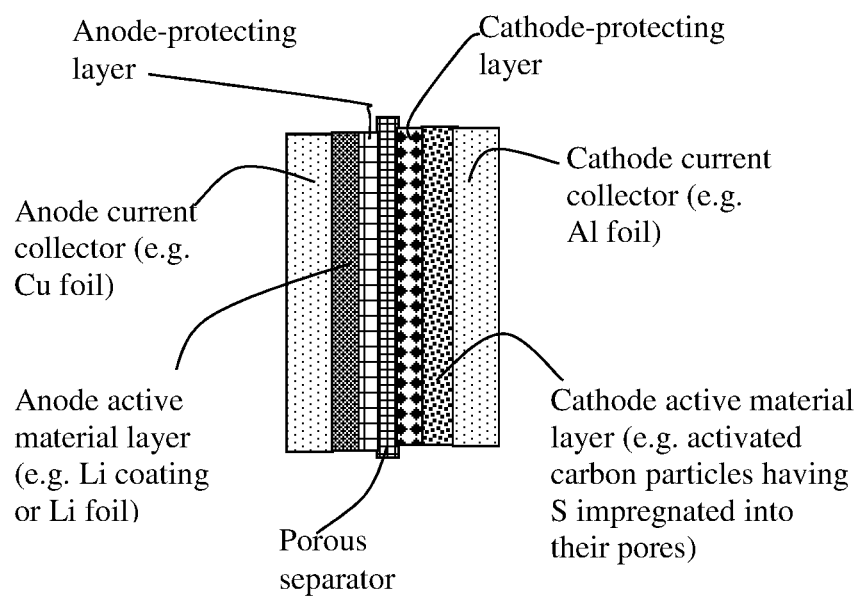
FIG. 2 Schematic of the presently invented alkali metal-sulfur cell containing an anode-protecting layer of a first sulfonated elastomer composite and/or a cathode-protecting layer of a second sulfonated elastomer composite. Either one or both protecting layers may be included in a lithium-sulfur cell, Na—S cell, or K—S cell.

In some embodiments, as illustrated in FIG. 2, the alkali metal-sulfur cell comprises (a) an anode active material layer and an optional anode current collector supporting the anode active material layer; (b) a cathode active material layer and an optional cathode current collector supporting the cathode active material layer; (c) an electrolyte (without a porous separator layer) in ionic contact with the anode active material layer and the cathode active material layer; and (d) a discrete anode-protecting layer disposed between the anode active material layer and the cathode active material layer; wherein the anode-protecting layer comprises an elastomer having a thickness from 1 nm to 100 µm, a fully recoverable tensile elastic strain from 2% to 1,000%, a lithium ion conductivity from $10^{-8}$ S/cm to $5\times10^{-2}$ S/cm, and an electron conductivity from $10^{-22}$ S/cm to $10^{-4}$ S/cm when measured at room temperature.

The invention also provides a method of improving a cycle-life of a rechargeable alkali metal-sulfur cell, the method comprising implementing an electronically non-conducting anode-protecting layer between an anode active material layer and a cathode active material without using a porous separator in the cell, wherein the anode-protecting layer has a thickness from 1 nm to 100 µm and comprises an elastomer having a fully recoverable tensile elastic strain from 2% to 1,000%, a lithium ion or sodium ion conductivity from $10^{-8}$ S/cm to $5\times10^{-2}$ S/cm, and an electronic conductivity less than $10^{-4}$ S/cm when measured at room temperature. This battery exhibits an excellent combination of high sulfur content, high sulfur utilization efficiency, high energy density, no known dendrite issue, no dead lithium or dead sodium issue, and a long cycle life.

Preferably, the elastomer composite layer has a lithium ion conductivity no less than $10^{-6}$ S/cm (typically from $10^{-5}$ S/cm to $5\times10^{-2}$ S/cm, measured at room temperature), and a thickness from 10 nm to 20 µm.

In the alkali metal-sulfur secondary battery, the electrolyte is preferably a non-solid state electrolyte preferably selected from organic liquid electrolyte, ionic liquid electrolyte, polymer gel electrolyte, quasi-solid electrolyte having a lithium salt dissolved in an organic or ionic liquid with a lithium salt concentration higher than 2.0 M (from 2.0M to 14 M; typically from 2.5 M to 10 M; and more typically from 3.5M to 7 M), or a combination thereof.

Preferably, the elastomer contains a sulfonated or non-sulfonated version of an elastomer selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly (ethylene-co-octene) (POE) elastomer, poly(ethylene-co-butene) (PBE) elastomer, styrene-ethylene-butadiene-styrene (SIBS) elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

The sulfur-carbon hybrid, sulfur-graphite hybrid, sulfur-graphene hybrid, or conducting polymer-sulfur hybrid may be a mixture, blend, composite, or chemically or physically bonded entity of sulfur or sulfide with a carbon, graphite, graphene, or conducting polymer material. For instance, a sulfur-graphene hybrid can be a simple mixture (in a particle form) of sulfur and graphene prepared by ball-milling. Such a hybrid can contain sulfur bonded on surfaces of a graphene oxide sheet, etc. As another example, the sulfur-carbon hybrid can be a simple mixture (in a particle form) of sulfur and carbon nanotubes, or can contain sulfur residing in pores of activated carbon particles. In the instant cathode layer, these particles of sulfur hybrid are embraced by a sulfonated elastomer composite.

In the rechargeable alkali metal-sulfur cell, the metal sulfide may contain a material denoted by $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M preferably is selected from Li, Na, K, Mg, Zn, Cu, Ti, Ni, Co, Fe, or Al. In some preferred embodiments, the metal sulfide in the cathode layer contains $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S_1$, $K_2S_2$, $K_2S_3$, $K_2S_4$, $K_2S_5$, $K_2S_6$, $K_2S_7$, $K_2S_8$, $K_2S_9$, or $K_2S_{10}$.

In the rechargeable alkali metal-sulfur cell, the carbon or graphite material in the cathode active material layer may be selected from mesophase pitch, mesophase carbon, meso-carbon microbead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, an activated version thereof, an activated carbon, acetylene black or the like, carbon black, or a combination thereof. The graphene may be selected from pristine graphene, graphene oxide, reduced graphene oxide (RGO), graphene fluoride, nitrogenated graphene, hydrogenated graphene, doped graphene, functionalized graphene, or a combination thereof.

The conducting polymer-sulfur hybrid may preferably contain an intrinsically conductive polymer selected from polyaniline, polypyrrole, polythiophene, polyfuran, a bi-cyclic polymer, a sulfonated derivative thereof, or a combination thereof. This can be a simple mixture of sulfur or metal sulfide with a conducting polymer.

The elastomer may comprise from 0.01% to 50% of an electrically non-conducting reinforcement material dispersed therein, wherein the reinforcement material is selected from a glass fiber, ceramic fiber, polymer fiber, glass particle, ceramic particle, polymer particle, or a combination thereof. This reinforcement increases the resistance of the elastomer layer to the penetration by any lithium or sodium dendrite, if ever initiated.

In certain embodiments, the elastomer contains from 0.1% to 50% by weight of a lithium ion-, sodium ion-, or potassium ion-conducting additive dispersed therein. The lithium ion-conducting additive, along with the conductive reinforcement material, is dispersed in the sulfonated elastomer matrix and is selected from $Li_2CO_3$, $Li_2O$, $Li_2C_2O_4$, LiOH, LiX, ROCO$_2$Li, HCOLi, ROLi, (ROCO$_2$Li)$_2$, (CH$_2$OCO$_2$Li)$_2$, Li$_2$S, Li$_x$SO$_y$, or a combination thereof, wherein X=F, Cl, I, or Br, R=a hydrocarbon group, 0<x≤1, 1≤y≤4.

The lithium ion-conducting additive may be selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphate (LiPF$_3$(CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof. The sodium ion- or potassium ion-conducting additive, dispersed in the UHMW polymer, may be selected from sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide potassium (KN(CF$_3$SO$_2$)$_2$), or a combination thereof.

An elastomer is a high-elasticity material, which exhibits an elastic deformation that is at least 2% when measured under uniaxial tension (without an additive or reinforcement in the polymer, but can contain a lithium salt and/or liquid solvent dispersed in the polymer). In the field of materials science and engineering, the "elastic deformation" is defined as a deformation of a material (when being mechanically stressed) that is essentially fully recoverable and the recovery is essentially instantaneous upon release of the load. The elastic deformation of the sulfonated elastomer is preferably and typically greater than 5%, more preferably and typically greater than 10%, further more preferably and typically greater than 30%, still more preferably greater than 50%, and most preferably greater than 100%.

In some embodiments, an elastomer is implemented between an anode active layer and a cathode active material layer. This anode-protecting layer may be pre-impregnated with a liquid electrolyte, which can be any kind of electrolyte commonly used in an alkali metal-sulfur battery.

Not wishing to be bound by theory, but the applicants believe that the anode-protecting layer is capable of performing at least the following three functions:

1) Being highly elastic, the elastomer layer helps to maintain a good contact between an alkali metal layer (e.g. lithium metal foil, as the anode active material) and an electrolyte phase when the alkali metal layer decreases in thickness (e.g. due to dissolution of Li in the electrolyte when the battery is discharged) or increases in thickness (e.g. due to re-deposition of lithium metal back to the Cu foil or lithium metal when the battery is recharged). The same function also works for the alkali metal-sulfur cell containing lithiated Si particles as an anode active material, as an example. Si particles and the entire anode active material layer can shrink and expand when the battery is discharged or charged. The elastomer can expand and shrink responsive to the shrinkage and expansion of the anode active material layer. Such a conformal or congruent expansion/shrinkage of the elastomer helps to eliminate the potential gap between the anode active material layer and the electrolyte, thereby maintaining the lithium ion migration paths required of an operational Li—S, Na—S, or K—S battery.

2) The elastomer, infiltrated with a liquid electrolyte (before, during, or after the cell is fabricated) and coupled with its high-elasticity nature (good electrode-electrolyte contact), enables the returning alkali metal ions (e.g. Li$^+$ or Na$^+$ ions) to uniformly and successfully deposit back to the alkali metal surface, reducing the formation of dead lithium particles (or dead sodium particles), which otherwise become inactive. The uniform deposition of alkali metal also reduces the tendency to form the dangerous Li or Na dendrite.

3) The anode-protecting layer also serves as a separator that electronically isolates the anode from the cathode.

4) The anode active material layer, the anode-protecting layer, and the cathode active material layer are laminated together; e.g. via roll-pressing so as to subject the anode-protecting layer to a compressive stress when the battery cell is made. When the Li—S cell is discharged, the lithium metal anode layer decreases in thickness and the sulfur cathode increases in thickness, but typically to a different extent (the anode shrinkage not equal to the cathode expansion). The elasticity of the elastomer-based protecting layer can accommodate the difference between the shrinkage and the expansion.

Alternatively, lithium sulfide may be used as the starting cathode active material. When the Li—S battery is charged and lithium ions are released from the cathode, the cathode active material layer contracts. However, the elastomer anode-protecting layer is capable of elastically expanding in a conformal manner; hence, leaving behind no gap between the protective layer (effectively also a separator) and the sulfur cathode layer. Such a configuration is amenable to subsequent lithium reaction with sulfur. The elastomer layer expands and shrinks congruently with the expansion and shrinkage of the cathode active material layer, enabling long-term cycling stability of a Li—S or Na—S battery.

B. Elastomer and Elastomer Composites

Preferably and typically, the elastomer has a lithium ion conductivity no less than $10^{-6}$ S/cm, more preferably no less than $10^{-4}$ S/cm, further preferably no less than $10^{-3}$ S/cm, and most preferably no less than $10^{-2}$ S/cm. In some embodiments, the elastomer contains no other additive or filler dispersed therein. In others, the elastomer contains from 0.1% to 50% (preferably 1% to 35%) by weight of a lithium ion-conducting additive dispersed in a elastomer matrix material. The elastomer must have a high elasticity (elastic deformation strain value>2%). An elastic deformation is a deformation that is fully recoverable and the recovery process is essentially instantaneous (no significant time delay). The elastomer can exhibit an elastic deformation from 5% up to 800%-1000% (8-10 times of its original length), more typically from 10% to 500%, and further more typically from 30% to 300%.

It may be noted that although a metal or a plastic typically has a high ductility (i.e. can be extended to a large strain without breakage), the majority of the deformation is plastic deformation (non-recoverable) and only a small amount of elastic deformation (typically <1% and more typically <0.2%). Thus, a metal or a plastic does not qualify as a high-elasticity material.

Further, we have unexpectedly discovered that the presence of an amount of a lithium salt or sodium salt (1-35% by weight) and a liquid solvent (0-50%) can significantly increase the lithium-ion or sodium ion conductivity of the elastomer.

The first step for producing an elastomer layer (sulfonated or un-sulfonated) is to dissolve an elastomer or its precursor (e.g. uncured oligomer or polymer) in a solvent to form a polymer solution. Subsequently, the non-electron-conducting reinforcement material and other additive are dispersed in this polymer solution to form a suspension (dispersion or slurry). This suspension can then be subjected to a film-forming procedure (e.g. spraying, printing, casting, coating, etc.) and a solvent removal treatment. The elastomer precursor is then cured or polymerized.

One may dispense and deposit a layer of an elastomer onto a primary surface of the anode active material layer. Alternatively, one may prepare a separate free-standing discrete layer of the elastomer first. This layer is then sandwiched between the anode active material layer and the cathode active material layer (e.g. via lamination) to form a battery cell. The procedures of spraying, printing, casting, coating, and laminating are well-known in the art.

In some embodiments, the elastomer may form a mixture with a lithium ion-conducting polymer selected from poly (ethylene oxide) (PEO), Polypropylene oxide (PPO), poly (acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a derivative thereof (e.g. sulfonated versions), or a combination thereof.

A wide variety of rubbers or elastomers may be readily sulfonated using known sulfonation procedures. Unsaturated rubbers that can be vulcanized to become elastomer include natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), Some elastomers are saturated rubbers that cannot be cured by sulfur vulcanization; they are made into a rubbery or elastomeric material via different means: e.g. by having a copolymer domain that holds other linear chains together. Each of these elastomers can be used to encapsulate particles of an anode active material by one of several means: melt mixing (followed by pelletizing and ball-milling, for instance), solution mixing (dissolving the anode active material particles in an uncured polymer, monomer, or oligomer, with or without an organic solvent) followed by drying (e.g. spray drying), interfacial polymerization, or in situ polymerization of elastomer in the presence of anode active material particles.

Sulfonated saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, and protein elastin. Sulfonated polyurethane and its copolymers (e.g. urea-urethane copolymer) are particularly useful elastomeric shell materials for encapsulating anode active material particles.

A variety of synthetic methods may be used to sulfonate an elastomer or rubber: (i) exposure to sulfur trioxide in vapor phase or in solution, possibly in presence of Lewis bases such as triethyl phosphate, tetrahydrofuran, dioxane, or amines; (ii) chlorosulfonic acid in diethyl ether; (iii) concentrated sulfuric acid or mixtures of sulfuric acid with alkyl hypochlorite; (iv) bisulfites combined to dioxygen, hydrogen peroxide, metallic catalysts, or peroxo derivates; and (v) acetyl sulfate.

Sulfonation of an elastomer or rubber may be conducted before, during, or after curing of the elastomer or rubber. Sulfonation of an elastomer or rubber may be accomplished by exposing the elastomer/rubber to a sulfonation agent in a solution state or melt state, in a batch manner or in a continuous process. The sulfonating agent may be selected from sulfuric acid, sulfonic acid, sulfur trioxide, chlorosulfonic acid, a bisulfate, a sulfate (e.g. zinc sulfate, acetyl sulfate, etc.), a mixture thereof, or a mixture thereof with another chemical species (e.g. acetic anhydride, thiolacetic acid, or other types of acids, etc.). In addition to zinc sulfate, there are a wide variety of metal sulfates that may be used as a sulfonating agent; e.g. those sulfates containing Mg, Ca, Co, Li, Ba, Na, Pb, Ni, Fe, Mn, K, Hg, Cr, and other transition metals, etc.

For instance, a triblock copolymer, poly(styrene-isobutylene-styrene) or SIBS, may be sulfonated to several different levels ranging from 0.36 to 2.04 mequiv./g (13 to 82 mol % of styrene; styrene being 19 mol % of the unsulfonated block copolymer). Sulfonation of SIBS may be performed in solution with acetyl sulfate as the sulfonating agent. First, acetic anhydride reacts with sulfuric acid to form acetyl sulfate (a sulfonating agent) and acetic acid (a by-product). Then, excess water is removed since anhydrous conditions are required for sulfonation of SIBS. The SIBS is then mixed with the mixture of acetyl sulfate and acetic acid. Such a sulfonation reaction produces sulfonic acid substituted to the para-position of the aromatic ring in the styrene block of the polymer. Elastomers having an aromatic ring may be sulfonated in a similar manner.

A sulfonated elastomer also may be synthesized by copolymerization of a low level of functionalized (i.e. sulfonated) monomer with an unsaturated monomer (e.g. olefinic monomer, isoprene monomer or oligomer, butadiene monomer or oligomer, etc.).

C. Additional Details about the Structure of Li—S, Na—S, and K—S Cells

The anode active material layer of an alkali metal-sulfur cell can contain a foil or coating of Li, Na, or K supported by a current collector (e.g. Cu foil), as illustrated in the left-hand portion of FIG. 1(A) for a prior art Li—S cell. Alternatively, the anode active material may contain, for instance, particles of prelithiated Si particles or surface-stabilized Li particles, as illustrated in the left-hand portion of FIG. 2(B). However, the cathode layer in the instant cell is distinct, as already discussed above.

The electrolyte for an alkali metal-sulfur cell may be an organic liquid electrolyte, ionic liquid electrolyte, gel polymer electrolyte, quasi-solid electrolyte or a combination thereof. The electrolyte typically contains an alkali metal salt (lithium salt, sodium salt, and/or potassium salt) dissolved in a solvent.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Among them, $LiPF_6$, $LiBF_4$ and $LiN(CF_3SO_2)_2$ are preferred for Li—S cells, $NaPF_6$ and $LiBF_4$ for Na—S cells, and $KBF_4$ for K—S cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulfoonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulfoonyl) imide, bis(fluorosulfoonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li—S cell.

In the presently invented alkali metal-sulfur cell, the cathode active layer comprises sulfur or a sulfur-containing compound preferably supported by or embedded in a conducting material, forming a sulfur-carbon hybrid, sulfur-graphite hybrid, sulfur-graphene hybrid, conducting polymer-sulfur hybrid, metal sulfide, sulfur compound, etc. These hybrid or compound materials are produced in the form of particles that contain a mixture, blend, composite, or bonded entity of sulfur or sulfide with a carbon, graphite, graphene, or conducting polymer material. Metal sulfides (e.g. lithium polysulfide, sodium polysulfide, etc.) and sulfur compounds are readily available in a fine particle form. Sulfur can be combined with a conducting material (carbon, graphite, graphene, and/or conducting polymer) to form a composite, mixture, or bonded entity (e.g. sulfur bonded on graphene oxide surface).

There are many well-known procedures that can be used to make the aforementioned sulfur-containing materials into particles. For instance, one may mix solid sulfur with a carbon or graphite material to form composite particles using ball-milling. The resulting particles are typically ellipsoidal or potato-like in shape having a size from 1 to 20 μm. Also, one may infiltrate S or sulfide into the pores of porous carbon or graphite particles (e.g. activated carbon, mesoporous carbon, activated carbon fibers, etc.) using vapor phase infiltration, solution infiltration, chemical infiltration, or electrochemical infiltration. Alternatively, one may deposit sulfur onto surfaces of graphene sheets, CNTs, carbon nanofibers, etc. and then form these S-coated nanomaterials into a spherical or ellipsoidal shape using high-intensity ball-milling, spray-drying (of their suspensions), aerosol formation, etc. These particles are then encapsulated with a sulfonated elastomer composite using the microencapsulation processes discussed above.

The cathode in a conventional Li—S cell typically has less than 70% by weight of sulfur in a composite cathode composed of sulfur and the conductive additive/support. Even when the sulfur content in the prior art composite cathode reaches or exceeds 70% by weight, the specific capacity of the composite cathode is typically significantly lower than what is expected based on theoretical predictions. For instance, the theoretical specific capacity of sulfur is 1,675 mAh/g. A composite cathode composed of 70% sulfur (S) and 30% carbon black (CB), without any binder, should be capable of storing up to 1,675×70%=1,172 mAh/g. Unfortunately, the observed specific capacity is typically less than 75% or 879 mAh/g (often less than 50% or 586 mAh/g in this example) of what could be achieved. In other words, the active material (S) utilization rate is typically less than 75% (or even <50%). This has been a major issue in the art of Li—S cells and there has been no solution to this problem.

Thus, it is highly advantageous to obtain a high sulfur loading and yet, concurrently, maintaining an ultra-thin/small thickness/diameter of sulfur for significantly enhanced sulfur utilization efficiency, energy density and power density. For instance, one can deposit nanoscaled sulfur (1-5 nm thick) on graphene surfaces using chemical, electrochemical, or vapor deposition to form S-coated or S-bonded graphene sheets. These S-coated or S-bonded graphene sheets are then aggregated together using a tumbling mixing, ball-milling, or spraying procedure. These steps enable the preparation of S-conducting material hybrids that contain 85%-99% by weight sulfur, yet maintaining a coating thickness or particle diameter from 1 nm to 5 nm. This ultra-small dimension enables fast lithium diffusion and lithium-sulfur reactions, leading to high S utilization efficiency (hence, high energy density) even at high charge-discharge rates. Several procedures of producing such small S particles or coating are illustrated in examples of this specification.

Again, the shuttling effect is related to the tendency for sulfur or alkali metal polysulfide that forms at the cathode to get dissolved in the solvent and for the dissolved lithium polysulfide species to migrate from the cathode to the anode, where they irreversibly react with lithium to form species that prevent sulfide from returning back to the cathode during the subsequent discharge operation of the Li—S cell (the detrimental shuttling effect). It appears that by implementing a cathode-protecting layer of a sulfonated elastomer composite, we have significantly reduced and even eliminated the shuttling effect, resulting in an alkali metal battery that has an exceptionally long cycle-life. We have solved the most critical, long-standing problem of alkali metal-sulfur batteries.

In all versions of the above-discussed alkali metal-sulfur cells, the anode active material may contain, as an example, lithium metal foil (or powder) or a high-capacity Si, Sn, Al, or $SnO_2$ capable of storing a great amount of lithium. The cathode active material may contain pure sulfur (if the anode active material contains lithium), lithium polysulfide, or any sulfur containing compound, molecule, or polymer. If the cathode active material includes lithium-containing species (e.g. lithium polysulfide) when the cell is made, the anode active material can be any material capable of storing a large amount of lithium (e.g. Si, Ge, Sn, Al, $SnO_2$, etc.).

At the anode side, when lithium metal is used as the sole anode active material in a Li—S cell, there is concern about the formation of lithium dendrites, which could lead to internal shorting and thermal runaway. Herein, we have observed that the use of a protecting layer containing a sulfonated elastomer composite can overcome the dendrite formation problem. The sulfonated elastomer composite may contain some reinforcement (0.1% to 30% by volume), selected from polymer fibers (e.g. Kevlar fibers), glass fibers, ceramic fibers, etc.

The presently invented protective layers may be incorporated in one of at least two broad classes of rechargeable alkali metal-sulfur cells (using Li as an example):
(A) Lithium metal-sulfur with a conventional anode configuration: The cell contains an optional cathode current collector, a cathode layer, an electrolyte, an anode, and an anode current collector. Potential dendrite formation may be overcome by using the invented anode-protecting layer.
(B) Lithium ion-sulfur cell with a conventional anode: For instance, the cell contains an anode composed of anode active graphite particles bonded by a binder, such as polyvinylidene fluoride (PVDF) or styrene-butadiene rubber (SBR). The cell also contains a cathode current collector, a cathode, an electrolyte, and an anode current collector. There can be an anode-protecting layer; and In the lithium-ion sulfur cell, the anode active material can be selected from a wide range of high-capacity materials, including (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe) and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof. Non-lithiated versions may be used if the cathode side contains lithium polysulfides or other lithium sources when the cell is made.

A possible lithium metal cell may be comprised of an anode current collector, a lithium metal layer, an anode-protecting layer, an electrolyte phase (but no porous separator, such as a porous polyethylene-polypropylene copolymer film), a sulfur cathode, and an optional cathode collector.

For a sodium ion-sulfur cell or potassium ion-sulfur cell, the anode active material layer can contain an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof (pre-doped or pre-loaded with Na), and combinations thereof.

Example 1: Mixing of Sulfur with Carbon/Graphite Particles Via Ball-Milling to Form Sulfur-Containing Particles Sulfur and lithium polysulfide particles and particles of soft carbon (i.e. graphitizable disordered carbon), natural graphite, mesophase carbon, expanded graphite flakes, carbon nanofibers, and graphene sheets (50% to 85% by weight of S in the resulting composite or hybrid) were physically blended and then subjected to ball milling for 2-24 hours to obtain S-containing composite particles (typically in a ball or potato shape). The particles have a typical size of 1-10 μm. These particles, along with a conductive additive (5% by wt.) and a resin binder (PVDF, 5%), were then combined and made into a layer of cathode using the well-known slurry coating procedure.

Example 2: Simple Sulfur Melt or Liquid Solution Mixing

One way to combine sulfur with a conducting material (e.g. carbon/graphite particles) is to use a solution or melt mixing process. Highly porous activated carbon particles, chemically etched mesocarbon microballs (activated MCMBs), and exfoliated graphite worms were mixed with sulfur melt at 117-120° C. (slightly above the melting point of S, 115.2° C.) for 10-60 minutes to obtain sulfur-impregnated carbon particles for use a cathode active material.

Example 3: Preparation of Sulfur-Coated Graphene Sheets and their Secondary Particles (Particulates)

The step involves producing vapor of elemental sulfur, allowing deposition of S vapor on surfaces of single-layer or few-layer graphene sheets. The graphene sheets, suspended in a liquid medium (e.g. graphene oxide in water or graphene in NMP), were sprayed onto a substrate (e.g. glass surface) to form a thin layer of graphene sheets. This thin layer of graphene was then exposed to sublimation-generated physical vapor deposition. Sublimation of solid sulfur occurs at a temperature greater than 40° C., but a significant and practically useful sublimation rate typically does not occur until the temperature is above 100° C. We typically used 117-160° C. with a vapor deposition time of 10-120 minutes to deposit a thin film of sulfur on graphene surface (sulfur thickness being approximately from 1 nm to 10 nm). This thin layer of graphene having a thin film of sulfur deposited thereon was then easily broken into pieces of S-coated graphene sheets using an air jet mill. Some of these sheets were made into secondary particles of approximately 5-15 μm in diameter (e.g. via spray-drying) and used as a cathode active material.

Example 4: Electrochemical Impregnation of S in Various Porous Carbon/Graphite Particles The electrochemical impregnation of S into pores of activated carbon fibers, activated carbon nanotubes, and activated artificial graphite particles was conducted by aggregating these particles/fibers into a loosely packed layer. In this approach, an anode, electrolyte, and a layer of such a loosely packed structure (serving as a cathode layer) are positioned in an external container outside of a lithium-sulfur cell. The needed apparatus is similar to an electroplating system, which is well-known in the art.

In a typical procedure, a metal polysulfide ($M_xS_y$) was dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polysulfide in this desired solvent. A greater solubility would mean a larger amount of sulfur can be derived from the electrolyte solution.

The electrolyte solution was then poured into a chamber or reactor under a dry and controlled atmosphere condition (e.g. He or nitrogen gas). A metal foil was used as the anode and a layer of the porous structure as the cathode; both being immersed in the electrolyte solution. This configuration constitutes an electrochemical impregnation and deposition system. The step of electrochemically impregnating sulfur into pores was conducted at a current density in the range from 1 mA/g to 10 A/g, based on the layer weight of the porous carbon/graphite particles/fibers.

The chemical reactions that occur in this reactor may be represented by the following equation: $M_xS_y \rightarrow M_xS_{y-z} + zS$ (typically z=1-4). The sulfur coating thickness or particle diameter and the amount of S coating/particles impregnated may be controlled by the electrochemical reaction current density, temperature and time. In general, a lower current density and lower reaction temperature lead to a more uniform impregnation of S and the reactions are easier to control. A longer reaction time leads to a larger amount of S saturated in the pores. Additionally, the electrochemical method is capable of rapidly converting the impregnated S into metal polysulfide (lithium polysulfide, sodium polysulfide, and potassium polysulfide, etc.).

Example 5: Chemical Reaction-Induced Impregnation of Sulfur

A chemical impregnation method was herein utilized to prepare S-impregnated carbon fibers that have been chemically activated. The procedure began with adding 0.58 g $Na_2S$ into a flask that had been filled with 25 ml distilled water to form a $Na_2S$ solution. Then, 0.72 g elemental S was suspended in the $Na_2S$ solution and stirred with a magnetic stirrer for about 2 hours at room temperature. The color of the solution changed slowly to orange-yellow as the sulfur dissolved. After dissolution of the sulfur, a sodium polysulfide ($Na_2S_x$) solution was obtained (x=4-10).

Subsequently, a sulfur-impregnated carbon fiber sample was prepared by a chemical impregnation method in an aqueous solution. First, 180 mg of expansion-treated carbon fibers was suspended in 180 ml ultrapure water with a surfactant and then sonicated at 50° C. for 5 hours to form a stable carbon fiber dispersion. Subsequently, the $Na_2S_x$ solution was added to the above-prepared dispersions in the presence of 5 wt % surfactant cetyl trimethyl-ammonium bromide (CTAB), the as-prepared carbon fiber/$Na_2S_x$ blended solution was sonicated for another 2 hours and then titrated into 100 ml of 2 mol/L HCOOH solution at a rate of 30-40 drops/min and stirred for 2 hours. Finally, the precipitate was filtered and washed with acetone and distilled water several times to eliminate salts and impurities. After filtration, the precipitate was dried at 50° C. in a drying oven for 48 hours. The reaction may be represented by the following reaction: $S_x^{2-} + 2H^+ \rightarrow (x-1) S + H_2S$.

Example 6: Redox Chemical Reaction-Induced Impregnation of Sulfur in Activated MCMBs and Activated Needle Coke In this chemical reaction-based deposition process, sodium thiosulfate ($Na_2S_2O_3$) was used as a sulfur source and HCl as a reactant. An activated MCMB-water or activated needle coke-water suspension was prepared and then the two reactants (HCl and $Na_2S_2O_3$) were poured into this suspension. The reaction was allowed to proceed at 25-75° C. for 1-3 hours, leading to impregnation of S into pores of the activated structures. The reaction may be represented by the following reaction: $2HCl+Na_2S_2O_3 \rightarrow 2NaCl+ S\downarrow, +SO_2\uparrow+H_2O$.

Example 7: Sulfonation of Triblock Copolymer Poly(Styrene-Isobutylene-Styrene) or SIBS Both non-sulfonated and sulfonated elastomers are used to build the anode-protecting layer in the present invention. The sulfonated versions typically provide a much higher lithium ion conductivity and, hence, enable higher-rate capability or higher power density. The elastomer matrix can contain a lithium ion-conducting additive, an electronically non-conducting reinforcement, and/or a lithium metal-stabilizing additive.

An example of the sulfonation procedure used in this study for making a sulfonated elastomer is summarized as follows: a 10% (w/v) solution of SIBS (50 g) and a desired amount of graphene oxide sheets (0 to 40.5% by wt.) in methylene chloride (500 ml) was prepared. The solution was stirred and refluxed at approximately 40° C., while a specified amount of acetyl sulfate in methylene chloride was slowly added to begin the sulfonation reaction. Acetyl sulfate in methylene chloride was prepared prior to this reaction by cooling 150 ml of methylene chloride in an ice bath for approximately 10 min. A specified amount of acetic anhydride and sulfuric acid was then added to the chilled methylene chloride under stirring conditions. Sulfuric acid was added approximately 10 min after the addition of acetic anhydride with acetic anhydride in excess of a 1:1 mole ratio. This solution was then allowed to return to room temperature before addition to the reaction vessel.

After approximately 5 h, the reaction was terminated by slowly adding 100 ml of methanol. The reacted polymer solution was then precipitated with deionized water. The precipitate was washed several times with water and methanol, separately, and then dried in a vacuum oven at 50° C. for 24 h. This washing and drying procedure was repeated until the pH of the wash water was neutral. After this process, the final polymer yield was approximately 98% on average. This sulfonation procedure was repeated with different amounts of acetyl sulfate to produce several sulfonated polymers with various levels of sulfonation or ion-exchange capacities (IECs). The mol % sulfonation is defined as: mol %=(moles of sulfonic acid/moles of styrene)×100%, and the IEC is defined as the mille-equivalents of sulfonic acid per gram of polymer (mequiv./g).

After sulfonation and washing of each polymer, the S-SIBS samples were dissolved in a mixed solvent of toluene/hexanol (85/15, w/w) with concentrations ranging from 0.5 to 2.5% (w/v). Desired amounts of Kevlar® fibers (du Pont) and a lithium metal-stabilizing additive (e.g. $LiNO_3$ and lithium tri-fluoro methane-sulfonimide) were then added into the solution to form slurry samples. The slurry samples were slot-die coated on a PET plastic substrate to form layers of sulfonated elastomer composite. A sulfonated elastomer layer was disposed between a Cu foil-supported lithium metal foil and a sulfur cathode layer and these layers were combined to form a Li—S cell without a conventional porous polymer-based separator. On a separate basis, a similar cell, but having a porous separator, was made for use as a control cell for comparison.

We have found that the presently invented Li—S cell performs at least equally well with the control cell in all aspects. The invented cell exhibits a higher volumetric and gravimetric energy density and power density since it is also lighter in weight and more compact in volume. The lithium metal-stabilizing additives were found to impart stability to lithium metal-electrolyte interfaces.

Example 8: Synthesis of Sulfonated Polybutadiene (PB) by Free Radical Addition of Thiolacetic Acid (TAA) Followed by In Situ Oxidation with Performic Acid A representative procedure is given as follows. PB (8.0 g) was dissolved in toluene (800 mL) under vigorous stirring for 72 h at room temperature in a 1 L round-bottom flask. Benzophenone (BZP) (0.225 g; 1.23 mmol; BZP/olefin molar ratio=1:120) and TAA (11.9 mL; 0.163 mol, TAA/olefin molar ratio=1.1) and a desired amount of Nylon fibers (0%-40% by wt.) were introduced into the reactor, and the polymer solution was irradiated for 1 h at room temperature with UV light of 365 nm and power of 100 W.

The resulting thioacetylated polybutadiene (PB-TA)/Nylon fiber composite was isolated by pouring 200 mL of the toluene solution in a plenty of methanol and the polymer recovered by filtration, washed with fresh methanol, and dried in vacuum at room temperature (Yield=3.54 g). Formic acid (117 mL; 3.06 mol; HCOOH/olefin molar ratio=25), along with a desired amount of anode active material particles, from 10 to 100 grams) were added to the toluene solution of PB-TA at 50° C. followed by slow addition of 52.6 mL of hydrogen peroxide (35 wt %; 0.61 mol; $H_2O_2$/olefin molar ratio=5) in 20 min. We would like to caution that the reaction is autocatalytic and strongly exothermic. The resulting slurry was cast to obtain sulfonated polybutadiene (PB-SA) composite layers. It may be noted that Nylon fibers or other additives or reinforcement materials may be added at different stages of the procedure: before, during or after BZP is added.

Example 9: Synthesis of Sulfonated SBS

Sulfonated styrene-butadiene-styrene triblock copolymer (SBS) based elastomer was directly synthesized. First, SBS (optionally along with a lithium ion-conducting additive or electron-conducting additive) is first epoxidized by performic acid formed in situ, followed by ring-opening reaction with an aqueous solution of $NaHSO_3$. In a typical procedure, epoxidation of SBS was carried out via reaction of SBS in cyclohexane solution (SBS concentration=11 g/100 mL) with performic acid formed in situ from HCOOH and 30% aqueous $H_2O_2$ solution at 70° C. for 4 h, using 1 wt. % poly(ethylene glycol)/SBS as a phase transfer catalyst. The molar ratio of $H_2O_2$/HCOOH was 1. The product (ESBS) was precipitated and washed several times with ethanol, followed by drying in a vacuum dryer at 60° C.

Subsequently, ESBS was first dissolved in toluene to form a solution with a concentration of 10 g/100 mL, into which was added 5 wt. % TEAB/ESBS as a phase transfer catalyst and 5 wt. % DMA/ESBS as a ring-opening catalyst. Herein, TEAB=tetraethyl ammonium bromide and DMA=N,N-dimethyl aniline. An aqueous solution of $NaHSO_3$ and $Na_2SO_3$ (optionally along with an additive or reinforcement material, if not added earlier) was then added with vigorous stirring at 60° C. for 7 h at a molar ratio of $NaHSO_3$/epoxy group at 1.8 and a weight ratio of $Na_2SO_3$/$NaHSO_3$ at 36%. This reaction allows for opening of the epoxide ring and attaching of the sulfonate group according to the following reaction:

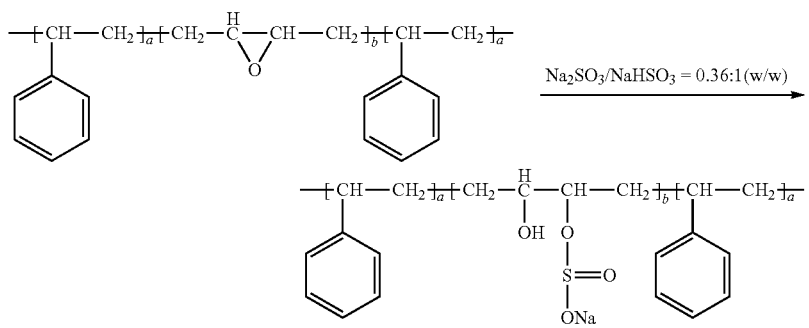

The reaction was terminated by adding a small amount of acetone solution containing antioxidant. The mixture was washed with distilled water and then precipitated by ethanol while being cast into thin films, followed by drying in a vacuum dryer at 50° C. It may be noted electronically non-conducting reinforcement (e.g. polymer fibers) and/or lithium ion-conducting additive (e.g. $Li_2CO_3$ and $NaBF_4$) may be added during various stages of the aforementioned procedure (e.g. right from the beginning, or prior to the ring opening reaction).

Example 10: Synthesis of Sulfonated SBS by Free Radical Addition of Thiolacetic Acid (TAA) Followed by In Situ Oxidation with Per-Formic Acid A representative procedure is given as follows. SBS (8.000 g) in toluene (800 mL) was left under vigorous stirring for 72 hours at room temperature and heated later on for 1 h at 65° C. in a 1 L round-bottom flask until the complete dissolution of the polymer. Thus, benzophenone (BZP, 0.173 g; 0.950 mmol; BZP/olefin molar ratio=1:132) and TAA (8.02 mL; 0.114 mol, TAA/olefin molar ratio=1.1) were added, and the polymer solution was irradiated for 4 h at room temperature with UV light of 365 nm and power of 100 W. To isolate a fraction of the thioacetylated sample (S(B-TA)S), 20 mL of the polymer solution was treated with plenty of methanol, and the polymer was recovered by filtration, washed with fresh methanol, and dried in vacuum at room temperature. The toluene solution containing the thioacetylated polymer was equilibrated at 50° C., and 107.4 mL of formic acid (2.84 mol; HCOOH/olefin molar ratio=27.5) and 48.9 mL of hydrogen peroxide (35 wt %; 0.57 mol; $H_2O_2$/olefin molar ratio=5.5) were added in about 15 min. It may be cautioned that the reaction is autocatalytic and strongly exothermic! The non-conductive reinforcement material was added before or after this reaction. The resulting slurry was stirred for 1 h, and then most of the solvent was distilled off in vacuum at 35° C. Finally, the slurry containing the sulfonated elastomer, along with desired additives, was added with acetonitrile and cast into films, washed with fresh acetonitrile, and dried in vacuum at 35° C. to obtain layers of sulfonated elastomers. These elastomer films were incorporated as an anode-protecting layer to make a Li—S and Na—S cell with or without an additional layer of porous polymer separator (commercially available porous PE-PP separator).

Other elastomers (e.g. polyisoprene, EPDM, EPR, polyurethane, etc.) were sulfonated in a similar manner. Alternatively, all the rubbers or elastomers can be directly immersed in a solution of sulfuric acid, a mixture of sulfuric acid and acetyl sulfate, or other sulfonating agent discussed above to produce sulfonated elastomers/rubbers. Again, desired additives or reinforcement materials may be added at various stages of the procedure.

Example 11: Sulfonated and Un-Sulfonated Elastomer Composite-Based Protective Layers Several tensile testing specimens were cut from sulfonated elastomer films (with or without additive/reinforcement) and tested with a universal testing machine. The testing results indicate that this series of elastomers have an elastic deformation from approximately 160% to 360%. These above are for neat sulfonated elastomers without any additive. The addition of up to 30% by weight of a lithium salt typically reduces this elasticity down to a reversible tensile strain from approximately 10% to 100%.

Several series of Li metal-sulfur and Li-ion sulfur cells were prepared using the presently prepared sulfonated elastomer composites as an anode-protecting layer. The first series was a Li metal cell containing an anode-protecting layer disposed between a sulfur cathode layer and the Li metal foil and the second series was also a Li metal cell having no anode-protecting layer (a conventional PE-PP porous separator was laminated between the lithium metal anode layer and the sulfur cathode layer). The third series was a Li-ion cell having a nanostructured anode of conductive filaments (based on electrospun carbon fibers coated with a thin layer of Si using CVD) plus an anode-protecting layer between this Si-based anode active material layer and a sulfur cathode layer. The fourth series was a Li-ion cell similar to the third series, but without an anode-protecting layer (a conventional PE-PP porous separator was laminated between the lithium metal anode layer and the sulfur cathode layer).

We have found that after large numbers of charge/discharge cycles, the cells containing an anode-protecting layer were essentially dendrite-free. Such an anode-protecting layer also appears to reduce the formation of dead lithium particles separated from the Li foil; this implies a more stable lithium-electrolyte interface. The presence of such an anode-protecting layer also has a dramatic impact on improving the cycle-life of an alkali metal-S cell by essentially eliminating the shuttle effect.

Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined). The specific charge capacity refers to the amount of charges per unit mass of the composite cathode. The specific energy and specific power values presented in this section are based on the total cell weight. The morphological or microstructural changes of selected samples after a desired number of repeated charging and recharging cycles were observed using both transmission electron microscopy (TEM) and scanning electron microscopy (SEM).

Figure 3:
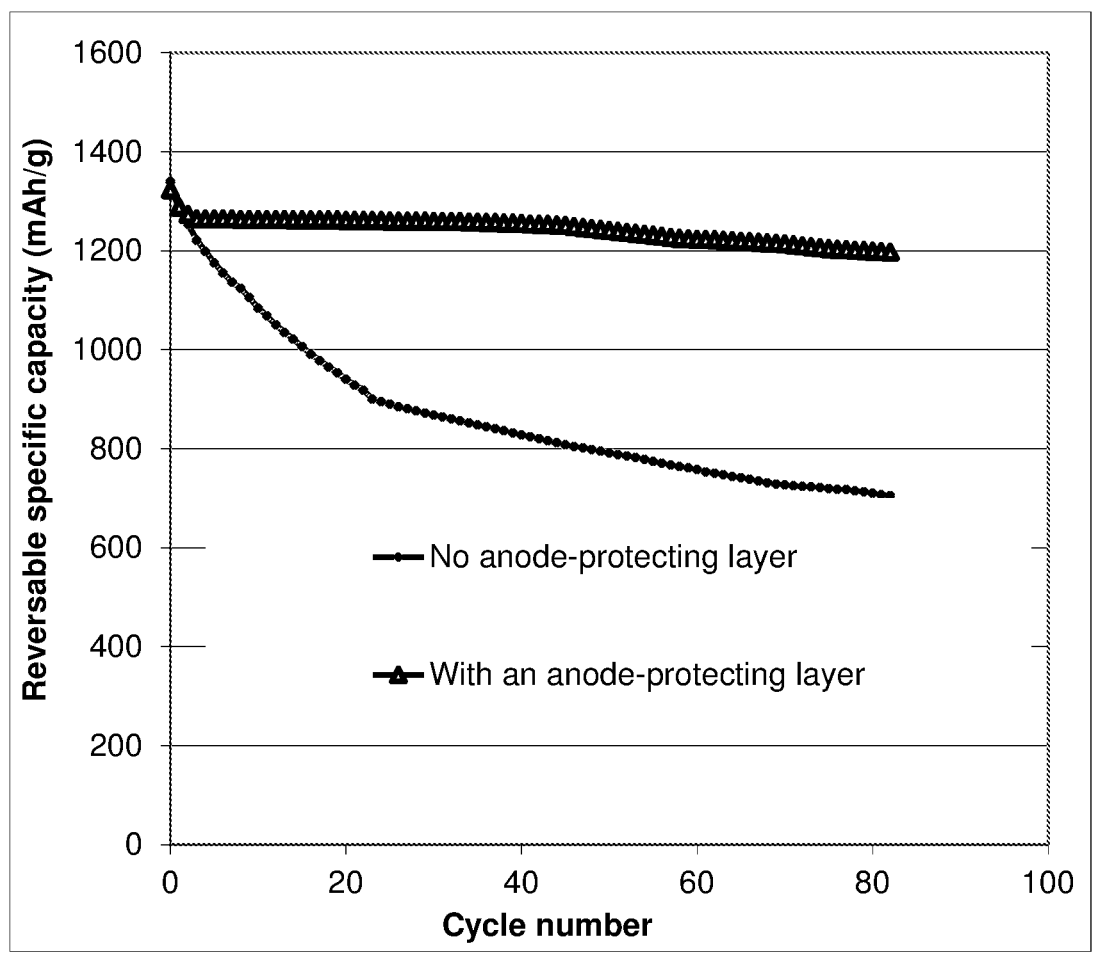
FIG. 3 The cycling behaviors of 2 Li—S cells, each having a Li foil anode and a cathode containing graphene-supported sulfur particles as the cathode active material: one without an anode-protecting layer and the other with an elastomer composite-based anode-protecting layer.

The cycling behaviors of 2 Li—S cells (each having a Li foil anode and a cathode containing graphene-supported sulfur (S/graphene) particles as the cathode active material) are shown in FIG. 3, which indicates that a sulfonated PU/Kevlar fiber composite-based anode-protecting layer is very effective in extending the cycle-life of a Li—S cell. The anode-protecting layer makes a more efficient use of lithium metal by reducing the amount of dead Li particles (these dead particles are physically separated from the Li metal foil and no longer active).

Example 12: Sulfonated SBS Elastomer Films as Electrode-Protecting Layers and Graphene/Sulfur Particles as a Cathode Active Material Tensile testing was also conducted on the sulfonated SBS elastomer films (without hybrid cathode particles). This series of elastomers can be elastically stretched up to approximately 230% (having some lithium salt dispersed therein).

Figure 4:
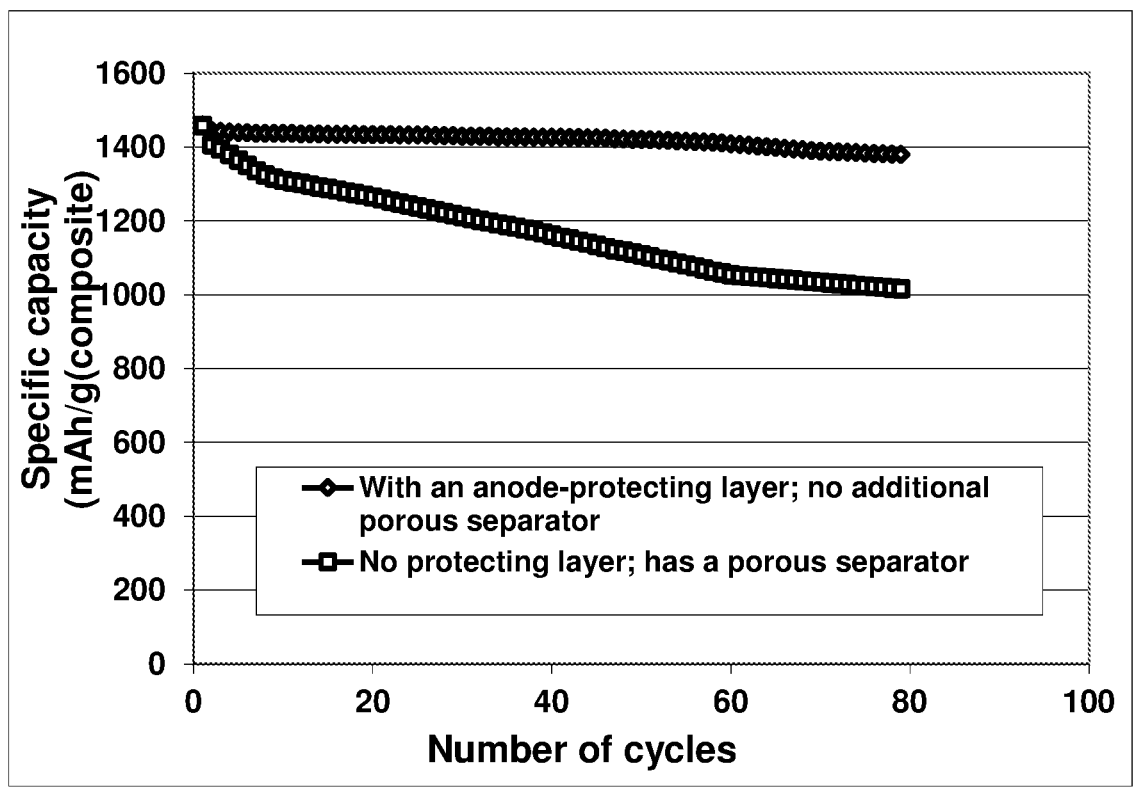
FIG. 4 The cathode specific capacity values of two Li—S batteries each containing ball-milled CNT/S particles as a cathode active material: one containing a sulfonated SBS elastomer composite-based anode-protecting layer and the other none.

Shown in FIG. 4 are the cycling behaviors of 2 Li—S cells (based on their discharge capacities after 70 cycles); one cell has an anode-protecting layer containing cellulose nanofiber-reinforced sulfonated SBS composite and the other cell has no anode-protecting layer (but has a conventional porous polymer separator). The sulfonated elastomer composite has imparted cycle stability to the Li—S cell in a most dramatic manner.

Figure 5:
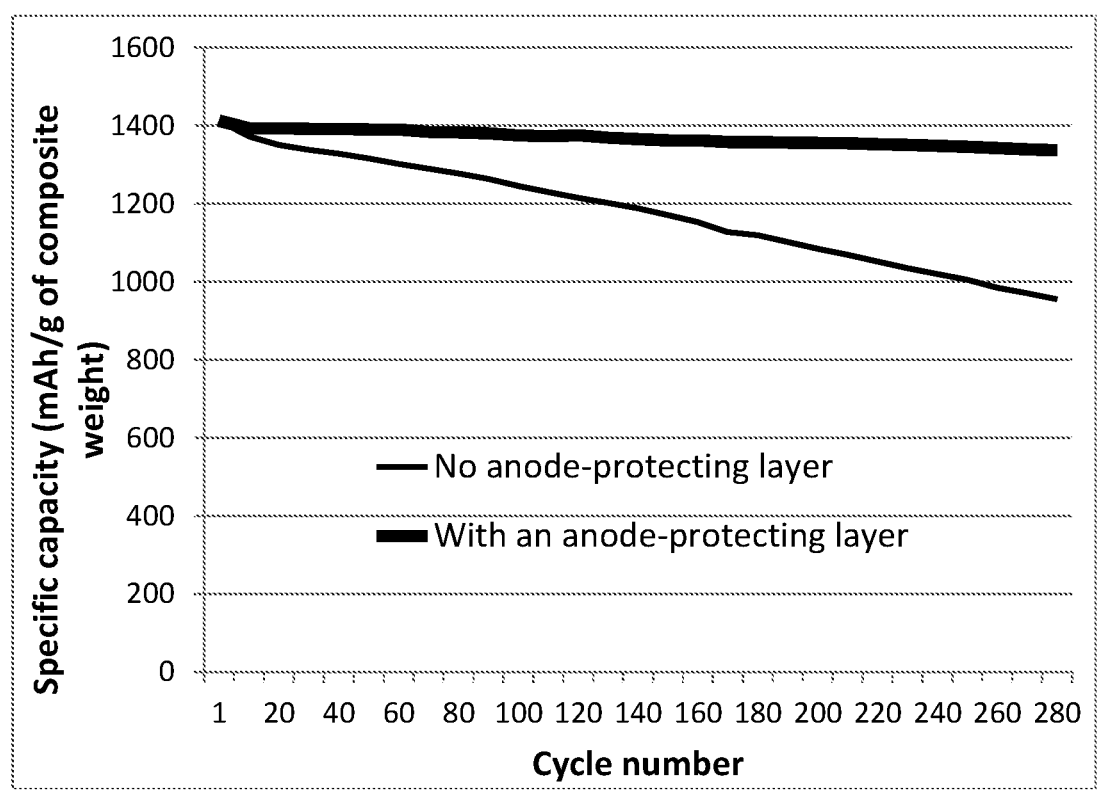
FIG. 5 The cathode specific capacity values of two Na—S cells having encapsulated sulfur-MCMB (activated) composite particles as the cathode active material; one cell featuring a sulfonated elastomer composite-based anode-protecting layer and the other cell does not have an anode-protecting layer (but has a PE-PP copolymer-based porous separator).

Example 13: Sulfonated PB Elastomer Composite-Based Anode-Protecting Layers and Sulfur-Impregnated Activated MCMB Particles as the Cathode Active Materials FIG. 5 shows the cycling behavior of two room-temperature Na—S cell: one cell has a SIBS/fluorinated graphene composite-based anode-protecting layer and a cathode active material layer containing sulfur-MCMB (activated) composite particles as the cathode active material and the other cell has a cathode containing sulfur-MCMB (activated) composite particles but no anode-protecting layer. Instead, a porous PE-PP copolymer membrane was used as a separator layer. Again, the sulfonated elastomer composite-based anode-protecting layer has significantly improved the cycle stability to the Na—S cell.

The above cycling stability data have clearly demonstrated that the shuttling effect commonly associated with Li—S or Na—S cells has been significantly reduced or essentially eliminated by the presently invented sulfonated elastomer composite-based anode-protecting layer approach. There was also no sodium dendrite-related issue associated with the invented Na—S cell.

Example 14: Effect of Lithium Ion-Conducting Additive in a Sulfonated Elastomer Composite A wide variety of lithium ion-conducting additives were added to several different sulfonated elastomers to prepare electrode-protecting layers. We have discovered that these composite materials are suitable protecting layers (preventing dendrite formation in the anode side and reducing/eliminating the shuttle effect (not allowing S or metal polysulfide to diffuse out of the cathode), yet still allowing reasonable alkali metal migration rates) provided that their lithium ion conductivity at room temperature is no less than $10^{-6}$ S/cm. With these materials, lithium ions appear to be capable of readily diffusing in and out of the protecting layer having a thickness no greater than 1 μm. For thicker layers (e.g. 10 μm), a lithium ion conductivity at room temperature no less than $10^{-4}$ S/cm would be required.

TABLE 1

Lithium ion conductivity of various sulfonated elastomer composite compositions as an anode-protecting layer material for protecting the alkali metal anode

| Sample No. | Lithium-conducting additive | Kevlar fiber-sulfonated elastomer (1-2 μm thick); 5% Kevlar unless otherwise noted | Li-ion conductivity (S/cm) |
|---|---|---|---|
| PU-1s | $Li_2CO_3 + (CH_2OCO_2Li)_2$ | 70-99% polyurethane, 2% Kevlar | $4.6 \times 10^{-6}$ to $4.7 \times 10^{-3}$ S/cm |
| PIS-1 | $Li_2CO_3 + (CH_2OCO_2Li)_2$ | 65-99% polyisoprene, 8% cellulosic fibers | $2.2 \times 10^{-5}$ to $7.6 \times 10^{-4}$ S/cm |
| SBR-1 | $Li_2CO_3 + (CH_2OCO_2Li)_2$ | 65-80% SBR, 15% Nylon fibers | $8.6 \times 10^{-6}$ to $8.6 \times 10^{-4}$ S/cm |
| UU | $Li_2CO_3 + (CH_2OCO_2Li)_2$ | 70-99% urethane-urea, 12% fluorinated graphene | $2.5 \times 10^{-6}$ to $7.5 \times 10^{-4}$ S/cm |
| PB-1 | $Li_2CO_3 + (CH_2OCO_2Li)_2$ | 75-99% polybutadiene | $2.4 \times 10^{-5}$ to $7.8 \times 10^{-3}$ S/cm |
| CR1s | $LiF + LiOH + Li_2C_2O_4$ | 80-99% chloroprene rubber | $2.2 \times 10^{-6}$ to $6.2 \times 10^{-4}$ S/cm |
| EPDM | $LiF + HCOLi$ | 80-99% EPDM | $5.6 \times 10^{-6}$ to $4.7 \times 10^{-3}$ S/cm |
| B3s | LiOH | 70-99% polyurethane | $4.4 \times 10^{-5}$ to $5.4 \times 10^{-3}$ S/cm |
| B4s | $Li_2CO_3$ | 70-99% polyurethane | $6.4 \times 10^{-5}$ to $5.7 \times 10^{-3}$ S/cm |
| B5s | $Li_2C_2O_4$ | 70-99% polyurethane | $1.7 \times 10^{-5}$ to $2.6 \times 10^{-3}$ S/cm |
| B6s | $Li_2CO_3 + LiOH$ | 70-99% polyurethane | $3.5 \times 10^{-5}$ to $579 \times 10^{-3}$ S/cm |
| C1s | $LiClO_4$ | 70-99% urethane-urea | $5.2 \times 10^{-5}$ to $4.7 \times 10^{-3}$ S/cm |
| C2s | $LiPF_6$ | 70-99% urethane-urea | $5.2 \times 10^{-5}$ to $1.7 \times 10^{-3}$ S/cm |
| C3s | $LiBF_4$ | 70-99% urethane-urea | $3.5 \times 10^{-5}$ to $4.7 \times 10^{-4}$ S/cm |
| C4s | $LiBOB + LiNO_3$ | 70-99% urethane-urea | $8.1 \times 10^{-6}$ to $3.1 \times 10^{-4}$ S/cm |
| S1s | Sulfonated polyaniline | 85-99% SBR | $9.0 \times 10^{-6}$ to $9.1 \times 10^{-4}$ S/cm |

TABLE 1-continued

Lithium ion conductivity of various sulfonated elastomer composite compositions as an anode-protecting layer material for protecting the alkali metal anode

| Sample No. | Lithium-conducting additive | Kevlar fiber-sulfonated elastomer (1-2 µm thick); 5% Kevlar unless otherwise noted | Li-ion conductivity (S/cm) |
|---|---|---|---|
| S2s | Sulfonated SBR | 85-99% SBR | $8.3 \times 10^{-6}$ to $6.2 \times 10^{-4}$ S/cm |
| S3s | Sulfonated PVDF | 80-99% chlorosulfonated polyethylene (CS-PE) | $5.3 \times 10^{-6}$ to $5.6 \times 10^{-4}$ S/cm |
| S4s | Polyethylene oxide | 80-99% CS-PE | $6.3 \times 10^{-6}$ to $4.5 \times 10^{-4}$ S/cm |

Figure 6:
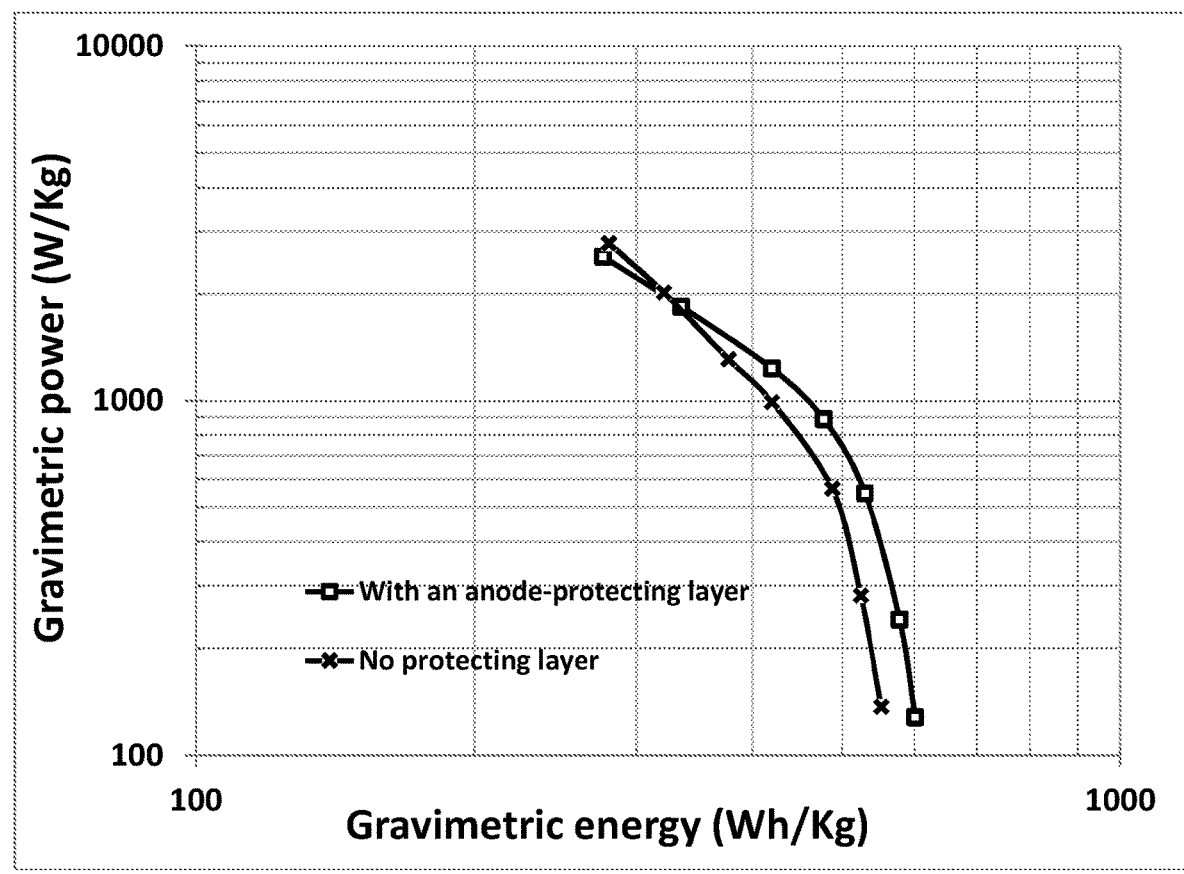
FIG. 6 Ragone plots (cell power density vs. cell energy density) of two Li metal-sulfur cells: one featuring an elastomer composite-based anode-protecting layer and the other without a protecting layer. The cathode active material is reduced graphene oxide-embraced S particles.
Figure 7:
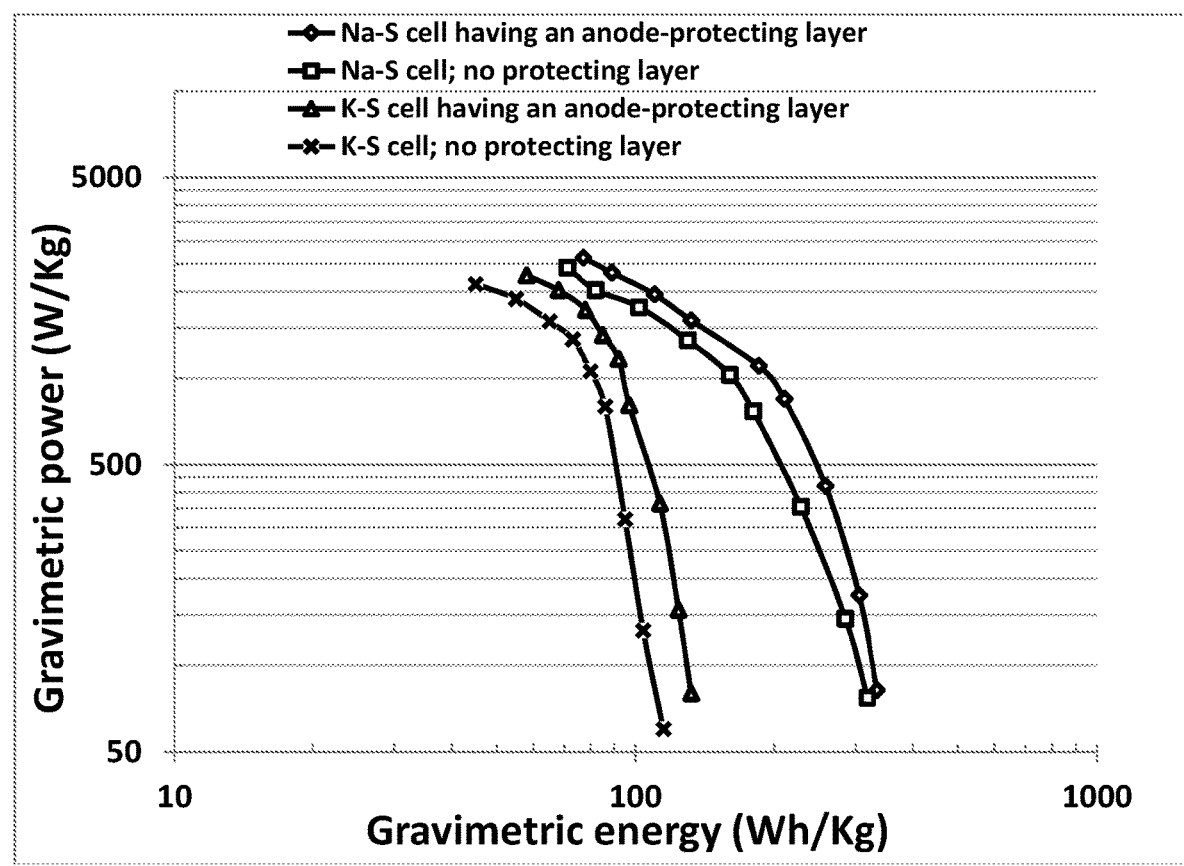
FIG. 7 Ragone plots (cell power density vs. cell energy density) of 4 alkali metal-sulfur cells each having a cathode active material layer containing particles of exfoliated graphite worms electrochemically impregnated with sulfur as the cathode active material: Na—S cell featuring a sulfonated elastomer composite-based anode-protecting layer, Na—S cell without a protecting layer, K—S cell featuring an anode-protecting layer, and K—S cell without a protecting layer.

Example 15: Cycle Stability of Various Rechargeable Lithium-Sulfur Battery Cells FIG. 6 and FIG. 7 indicate that the presence of a sulfonated elastomer composite-based protecting layer does not compromise the energy density of an alkali metal-sulfur cell even though this composite shell is normally less electron-conducting than a carbon coating and less ion-conducting than a liquid electrolyte. Quite unexpectedly, the energy density of the cell is actually improved, defying the expectations of materials scientists.

In lithium battery industry, it is a common practice to define the cycle life of a battery as the number of charge-discharge cycles that the battery suffers 20% decay in capacity based on the initial capacity measured after the required electrochemical formation. Summarized in Table 2 below are the cycle life data of a broad array of batteries featuring presently invented sulfonated elastomer composite-encapsulated sulfur cathode particles vs. other types of cathode active materials.

TABLE 2

Cycle life data of various lithium-sulfur batteries.

| Sample ID | Type of sulfonated elastomer (+2% Kevlar or cellulosic fibers) in anode | Type & % of cathode active material | Initial capacity (mAh/g) | Cycle life (No. of cycles) |
|---|---|---|---|---|
| Kev-1 | Sulfonated PB layer | 80% by wt. S + 7% CNF + 5% binder + 8% CB | 1,261 | 1,245 |
| K-2 | No elastomer layer | 80% by wt. S + 7% CNF + 5% binder + 8% CB | 1,280 | 144 |
| AC-1 | No elastomer layer | 70% S + 15% AC + 8% binder + 7% CB | 1,252 | 152 |
| AC-2 | SBS (75%) + PEO (25%) | 70% S + 15% AC + 8% binder + 7% CB | 1,253 | 1,224 |
| Gn-3 | PU-cellulosic fiber layer | 90% S (coated on graphene sheets) | 1449 | 1,665 |
| Gn-4 | No elastomer layer | 90% S (coated on graphene sheets) | 1448 | 125 |
| CB-1 | No elastomer layer | 70% S + 22% CB + 8% binder | 1031 | 66 |
| CB-2 | SIBS layer | 70% S + 22% CB + 8% binder | 1036 | 1288 |

The following observations can be made from the data of Table 2 and FIG. 3-FIG. 7:
1) The presently invented conductive sulfonated elastomer composite-based protective layer approach enables the Li—S, Na—S, and K—S batteries to deliver high cycling stability or long cycle life.
2) The invented approach also leads to alkali metal-sulfur batteries having exceptional energy densities and power densities. A cell-level energy density as high as 605 Wh/kg has been achieved with Li—S cells.
3) Similar advantageous features are also observed with Na—S cells and K—S cells. This is evidenced by FIG. 7, which shows the Ragone plots (cell power density vs. cell energy density) of 4 alkali metal-sulfur cells:

In summary, the present invention provides an innovative, versatile, and surprisingly effective platform materials technology that enables the design and manufacture of superior alkali metal-sulfur rechargeable batteries. The alkali metal-sulfur cell featuring an anode-protective layer exhibits a high resistance to dendrite formation, high specific capacity, high specific energy, high power density, little or no shuttling effect, and long cycle life.

The invention claimed is:

1. A rechargeable alkali metal-sulfur cell selected from lithium-sulfur cell, sodium-sulfur cell, or potassium-sulfur cell, said alkali metal-sulfur cell comprising:
   (a) an anode active material layer and an optional anode current collector supporting said anode active material layer;
   (b) a cathode active material layer, comprising a sulfur-containing material selected from a sulfur-carbon hybrid, sulfur-graphite hybrid, sulfur-graphene hybrid, conducting polymer-sulfur hybrid, metal sulfide, sulfur compound, or a combination thereof, and an optional cathode current collector supporting said cathode active material layer;
   (c) a discrete, electronically non-conducting anode-protecting layer disposed between said anode active material layer and said cathode active material layer, wherein said anode-protecting layer has a thickness from 1 nm to 100 µm and comprises an elastomer having a fully recoverable tensile elastic strain from 2% to 1,000%, a lithium ion or sodium ion conductivity from $10^{-8}$ S/cm to $5 \times 10^{-2}$ S/cm, and an electronic conductivity less than $10^{-4}$ S/cm when measured at room temperature; and (d) a non-solid-state electrolyte, in ionic contact with said anode active material layer and said cathode active material layer;

wherein said cell contains no porous separator.

2. The rechargeable alkali metal-sulfur cell of claim 1, wherein said non-solid-state electrolyte is selected from an organic liquid electrolyte, ionic liquid electrolyte, polymer gel electrolyte, quasi-solid electrolyte having a lithium salt dissolved in an organic or ionic liquid with a lithium salt concentration higher than 2.0 M, or a combination thereof.

3. The rechargeable alkali metal-sulfur cell of claim 1, wherein said anode active material layer, said anode-protecting layer, and said cathode are laminated together in such manner that the battery cell is under a compressive stress or strain when the cell is made.

4. The rechargeable alkali metal-sulfur cell of claim 1, wherein said sulfur-carbon hybrid, sulfur-graphite hybrid, sulfur-graphene hybrid, or conducting polymer-sulfur hybrid is a mixture, blend, composite, chemically or physically bonded entity of sulfur or sulfide with a carbon, graphite, graphene, or conducting polymer material.

5. The rechargeable alkali metal-sulfur cell of claim 1, wherein said elastomer contains a material selected from a non-sulfonated or sulfonated version of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) elastomer, poly(ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

6. The rechargeable alkali metal-sulfur cell of claim 1, wherein said elastomer comprises from 0.01% to 50% of an electrically non-conducting reinforcement material dispersed therein, wherein said reinforcement material is selected from a glass fiber, ceramic fiber, polymer fiber, glass particle, ceramic particle, polymer particle, or a combination thereof.

7. The rechargeable alkali metal-sulfur cell of claim 1, wherein said graphene comprises single-layer graphene or few-layer graphene, wherein said few-layer graphene is defined as a graphene platelet formed of 10 or less than 10 graphene planes.

8. The rechargeable alkali metal-sulfur cell of claim 1, wherein said metal sulfide contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

9. The rechargeable alkali metal-sulfur cell of claim 8, wherein said metal element M is selected from Li, Na, K, Mg, Zn, Cu, Ti, Ni, Co, Fe, or Al.

10. The rechargeable alkali metal-sulfur cell of claim 1, wherein said metal sulfide contains $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S_1$, $K_2S_2$, $K_2S_3$, $K_2S_4$, $K_2S_5$, $K_2S_6$, $K_2S_7$, $K_2S_8$, $K_2S_9$, or $K_2S_{10}$.

11. The rechargeable alkali metal-sulfur cell of claim 1, wherein said carbon or graphite material in said cathode active material layer is selected from mesophase pitch, mesophase carbon, mesocarbon microbead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, an activated version thereof, activated carbon, carbon black, acetylene black, or a combination thereof.

12. The rechargeable alkali metal-sulfur cell of claim 1, wherein said conducting polymer-sulfur hybrid contains an intrinsically conductive polymer selected from polyaniline, polypyrrole, polythiophene, polyfuran, a bi-cyclic polymer, a sulfonated derivative thereof, or a combination thereof.

13. The rechargeable alkali metal-sulfur cell of claim 1, wherein said elastomer further contains from 0.1% to 50% by weight of a lithium ion-conducting additive or sodium ion-conducting additive dispersed therein.

14. The rechargeable alkali metal-sulfur cell of claim 13, wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

15. The rechargeable alkali metal-sulfur cell of claim 13, wherein said lithium ion-conducting additive is dispersed in said elastomer and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl) imide, lithium bis(fluorosulfonyl)imide, lithium trifluoromethanesulfonimide (LiTFSI), an ionic liquid-based lithium salt, or a combination thereof.

16. The rechargeable alkali metal-sulfur cell of claim 13, wherein said lithium ion-conducting additive is selected from poly(ethylene oxide) (PEO), polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, polyvinyl chloride, polydimethylsiloxane, poly(vinylidene fluoride)-hexafluoropropylene (PVDF-HFP), a sulfonated derivative thereof, or a combination thereof.

17. The rechargeable alkali metal-sulfur cell of claim 1, wherein said cell has a sulfur utilization efficiency from 80% to 99%.

18. The rechargeable alkali metal-sulfur cell of claim 1, wherein said electrolyte contains a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoroethylsulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide potassium (KN(CF$_3$SO$_2$)$_2$), or a combination thereof.

19. The rechargeable alkali metal-sulfur cell of claim 1, wherein said electrolyte contains a solvent selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

20. The rechargeable alkali metal-sulfur cell of claim 1, wherein said anode active material layer contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, Li$_4$Ti$_5$O$_{12}$, or a combination thereof.

21. The rechargeable alkali metal-sulfur cell of claim 1, wherein said cell is a lithium ion-sulfur cell and said anode active material layer contains an anode active material selected from the group consisting of:
   (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe) and cadmium (Cd), and lithiated versions thereof;
   (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric;
   (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof;
   (d) salts and hydroxides of Sn and lithiated versions thereof;
   (e) carbon or graphite materials and prelithiated versions thereof; and
   combinations thereof.

22. The rechargeable alkali metal-sulfur cell of claim 1, wherein said cell is a sodium ion-sulfur cell or potassium ion-sulfur cell and said anode active material layer contains an anode active material selected from the group consisting of:
   (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
   (b) Sodium- or potassium-containing alloys or intermetallic compounds of Si, Ge, Sn, Pb, Sb, Bi, Zn, Al, Ti, Co, Ni, Mn, Cd, and their mixtures;
   (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof,
   (d) Sodium or potassium salts;
   (e) particles of graphite, hard carbon, soft carbon or carbon particles and pre-sodiated versions thereof; and combinations thereof.

* * * * *